United States Patent
Singh et al.

(10) Patent No.: US 9,247,571 B2
(45) Date of Patent: *Jan. 26, 2016

(54) CONCENTRATOR FOR MULTIPLEXING ACCESS POINT TO WIRELESS NETWORK CONNECTIONS

(71) Applicant: QUALCOMM Incorporated, San Diego, CA (US)

(72) Inventors: Damanjit Singh, San Diego, CA (US); Gavin Bernard Horn, La Jolla, CA (US); Osok Song, San Diego, CA (US); Peerapol Tinnakornsrisuphap, San Diego, CA (US); Rajarshi Gupta, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/591,891

(22) Filed: Jan. 7, 2015

(65) Prior Publication Data
US 2015/0124756 A1      May 7, 2015

Related U.S. Application Data

(63) Continuation of application No. 12/487,575, filed on Jun. 18, 2009, now Pat. No. 8,964,636.

(60) Provisional application No. 61/074,978, filed on Jun. 23, 2008, provisional application No. 61/079,393, filed on Jul. 9, 2008, provisional application No. 61/087,145, filed on Aug. 7, 2008.

(51) Int. Cl.
*H04W 4/00* (2009.01)
*H04W 76/02* (2009.01)
(Continued)

(52) U.S. Cl.
CPC ............ *H04W 76/021* (2013.01); *H04W 68/00* (2013.01); *H04W 88/08* (2013.01);
(Continued)

(58) Field of Classification Search
None
See application file for complete search history.

(56) References Cited

U.S. PATENT DOCUMENTS

| 6,968,196 B1 | 11/2005 | Back et al. |
| 8,125,939 B2 | 2/2012 | Murasawa et al. |

(Continued)

FOREIGN PATENT DOCUMENTS

| CN | 1972514 A | 5/2007 |
| CN | 101009927 A | 8/2007 |

(Continued)

OTHER PUBLICATIONS

Alcatel-Lucent: "E-UTRAN architecture for the Home eNode B" 3GPP Draft ; R3-080671_HEBN, 3rd Generation Partnership Project (3GPP), Mobile Competence Centre ; 650, Route Des Lucioles ; F-06921 Sophia-Antipolis Cedex ; France, vol. RAN WG3, no. Shenzhen, China; 20080326, Mar. 26, 2008, XP050163891 [retrieved on Mar. 26, 2008] p. 1, paragraph 2.1. p. 2, lines 9-21 p. 5, line 11-p. 6, line 25.

(Continued)

*Primary Examiner* — Afshawn Towfighi
(74) *Attorney, Agent, or Firm* — François A. Pelaez

(57) ABSTRACT

Systems and methodologies are described that facilitate multiplexing communications from multiple downstream access points to one or more mobility management entities (MME). In particular, a concentrator component is provided that can establish a single transport layer connection with an MME along with multiple application layer connections over the single transport layer connection for each of multiple downstream access points and/or related mobile devices. The downstream access points and/or mobile devices can provide identifiers, such as tracking identifiers, to the concentrator component, which can utilize the identifiers to track communications with the MME. In this regard, the MME can send paging messages, and the concentrator component can determine downstream access points related to the paging messages based on a stored association with a tracking identifier in the paging message.

22 Claims, 21 Drawing Sheets

(51) Int. Cl.
*H04W 68/00* (2009.01)
*H04W 88/08* (2009.01)
*H04W 36/00* (2009.01)
*H04W 36/08* (2009.01)
*H04W 84/04* (2009.01)
*H04W 88/12* (2009.01)
*H04W 92/12* (2009.01)
*H04W 92/20* (2009.01)

(52) U.S. Cl.
CPC ........... *H04W36/0005* (2013.01); *H04W 36/08* (2013.01); *H04W 84/045* (2013.01); *H04W 88/12* (2013.01); *H04W 92/12* (2013.01); *H04W 92/20* (2013.01)

(56) References Cited

U.S. PATENT DOCUMENTS

| | | | |
|---|---|---|---|
| 8,964,636 B2* | 2/2015 | Singh et al. | 370/328 |
| 2004/0185876 A1* | 9/2004 | Groenendaal et al. | 455/456.5 |
| 2007/0010197 A1 | 1/2007 | Yokosawa et al. | |
| 2007/0064686 A1 | 3/2007 | Bae et al. | |
| 2008/0013553 A1 | 1/2008 | Shaheen | |
| 2008/0320149 A1 | 12/2008 | Faccin | |
| 2009/0003283 A1 | 1/2009 | Meylan | |
| 2009/0005048 A1 | 1/2009 | Bae et al. | |
| 2009/0005051 A1 | 1/2009 | Voyer et al. | |
| 2009/0052423 A1 | 2/2009 | Aghvami et al. | |
| 2009/0073936 A1 | 3/2009 | Jentz et al. | |
| 2009/0080382 A1 | 3/2009 | Chen et al. | |
| 2009/0156213 A1 | 6/2009 | Spinelli et al. | |
| 2009/0201813 A1 | 8/2009 | Speight | |
| 2009/0316604 A1 | 12/2009 | Singh et al. | |
| 2009/0316629 A1 | 12/2009 | Singh et al. | |
| 2009/0316657 A1 | 12/2009 | Singh et al. | |
| 2010/0035617 A1 | 2/2010 | Whinnett | |
| 2010/0113015 A1 | 5/2010 | Casati et al. | |
| 2010/0232391 A1 | 9/2010 | Olsson et al. | |
| 2011/0002292 A1 | 1/2011 | Wang et al. | |
| 2011/0044279 A1 | 2/2011 | Johansson et al. | |
| 2011/0075633 A1 | 3/2011 | Johansson et al. | |
| 2011/0158171 A1 | 6/2011 | Centonza et al. | |
| 2011/0223919 A1 | 9/2011 | Vikberg et al. | |
| 2011/0269499 A1 | 11/2011 | Vikberg et al. | |
| 2011/0286429 A1 | 11/2011 | Vikberg et al. | |
| 2012/0069737 A1 | 3/2012 | Vikberg et al. | |
| 2012/0269168 A1 | 10/2012 | Qiu | |
| 2013/0294410 A1 | 11/2013 | Shuai et al. | |
| 2014/0038603 A1 | 2/2014 | Guo et al. | |

FOREIGN PATENT DOCUMENTS

| | | |
|---|---|---|
| EP | 1783962 A1 | 5/2007 |
| EP | 1916857 A1 | 4/2008 |
| JP | 6327047 A | 11/1994 |
| JP | 2000069046 A | 3/2000 |
| JP | 2004023314 A | 1/2004 |
| JP | 2007019807 A | 1/2007 |
| JP | 2009515453 A | 4/2009 |
| RU | 2154356 C2 | 8/2000 |
| RU | 2199834 C2 | 2/2003 |
| WO | 9908457 A2 | 2/1999 |
| WO | 0180582 A2 | 10/2001 |
| WO | 2004082214 A2 | 9/2004 |
| WO | 2006012909 A1 | 2/2006 |
| WO | 2007051840 A1 | 5/2007 |
| WO | 2008038989 A1 | 4/2008 |
| WO | 2010008856 A1 | 1/2010 |

OTHER PUBLICATIONS

Ericsson: "S1-handover routing with auto configuration for HeNBs (R3-081352)" 3GPP TSG-RAN WG3 #60, [Online] May 5, 2008, May 9, 2008 pp. 1-3, XP002565258 Kansas City, USA Retrieved from the Internet: URL: http://webstats. 3gpp. org/ftp/tsg- ran/WG3-Iu/TSGR3-60/Docs/> [retrieved on Jan. 25, 2010] paragraph [02.1].
International Search Report and Written Opinion—PCT/US2009/048309—ISA/EPO—Feb. 3, 2010.
International Search Report and Written Opinion—PCT/US2009/048312—ISA/EPO—Dec. 2, 2009.
International Search Report and Written Opinion—PCT/US2009/048316—ISA/EPO—Oct. 14, 2009.
Mitsubishi Electric: "EUTRAN Proxy in support of massive deployment of HNBs", 3GPP Draft; R3-080062 (HNB Proxy), 3rd Generation Partnership Project (3GPP), Mobile Competence Centre ; 650, Route Des Lucioles ; F-06921 Sophia-Antipolis Cedex ; France, vol. RAN WG3, no. Sorrento, Italy; Feb. 5, 2008, XP050163296, [retrieved on Feb. 5, 2008].
Mitsubishi Electric: "EUTRAN topology in support of home eNodeBs", 3GPP TSG RAN WG3 Meeting #57 R3-071589, Athens, Greece, Aug. 15, 2007, (found on Mar. 20, 2012), found in Internet http://www.3gpp.org/ftp/tsg_ran/WG3_lu/TSGR3_57/docs/.
Mitsubishi Electric: "HeNBs and X2 interface (R3-081122)" 3GPP TSG RAN WG3 Meeting #60, [Online] May 5, 2008, May 9, 2008 pp. 1-3, XP002565257 Kansas City, USA Retrieved from the Internet: URL: http://webstats. 3gpp. org/ftp/tsg-ran/W G3-lu/TSGR3_60/Docs/> [retrieved on 2010-01-251.
NEC: "Discussion and proposal for the AP ID handling" 3GPP Draft; R3-071344-LTE-UE-Context-SEI, 3rd Generation Partnership Project (3GPP), Mobile Competence Centre ; 650, Route Des Lucioles ; F-06921 Sophia-Anti Polis Cedex ; France, vol. RAN WG3, no. Athens, Greece; Aug. 15, 2007, XP050162181 [retrieved on Aug. 15, 2007] p. 1, paragraph 3.
NEC (Rapporteur): "RAN3 agreed changes to TS 36.401" 3GPP Draft; R3-081589-36401-BIG-CR-R1, 3rd Generation Partnership Project (3GPP), Mobile Competence Centre ; 650, Route Des Lucioles ; F-06921 Sophia-Antipolis Cedex ; France, vol. RAN WG3, no. Kansas City, USA; May 16, 2008, XP050164743 [retrieved on May 16, 2008] p. 12, paragraph 6.2.1.
Nokia Siemens Networks et al: "HeNBA s S1 simplification by means of HeNB GW" 3GPP Draft; R3-080155 HENB Architecture Considerations, 3rd Generation Partnership Project (3GPP), Mobile Competence Centre ; 650, Route Des Lucioles ; F-06921 Sophia-Antipolis Cedex ; France, vol. RAN WG3, no. Sorrento, Italy ; Feb. 5, 2008, XP050163378 [retrieved on Feb. 5, 2008] p. 2, paragraph 8.
Nokia Siemens Networks, et al.: "Impact on S1AP from HeNB GW Concept," 3GPP Draft, R3-080465, 3rd Generation Partnership Project, Competence Centre, February 18, 2008, XP050163662.
Taiwan Search Report—TW098121029—TIPO—Oct. 9, 2012.
Taiwan Search Report—TW098121036—TIPO—May 14, 2013.
Wang L.; Zhang Y.; Wei Z.: "Mobility management schemes at radio network layer for LTE femtocells" 2009 IEEE 69th Vehicular Technology Conference, [Online] Apr. 26, 2009, Apr. 29, 2009 pp. 1-5, XP002565259 Piscataway, NJ, USA Retrieved from the Internet: URL: http://ieeexpl ore. ieee. org/stamp/stamp. jsp"arnumber=05073682> [ retrieved on Jan. 26, 2010] p. 2, left-hand column, paragraph 1-p. 3, left-hand column, paragraph 3.

* cited by examiner

CONCENTRATOR FOR MULTIPLEXING ACCESS POINT TO WIRELESS NETWORK CONNECTIONS

CLAIM OF PRIORITY AND CROSS-REFERENCE TO RELATED APPLICATION

The present Application for Patent is a continuation of pending U.S. patent application Ser. No. 12/487,575 entitled "CONCENTRATOR FOR MULTIPLEXING ACCESS POINT TO WIRELESS NETWORK CONNECTIONS," filed Jun. 18, 2009, which claims the benefit of and priority to commonly owned Provisional Application No. 61/074,978 entitled "SYSTEMS AND METHODS TO REDUCE ASSOCIATIONS AND/OR PORTS REQUIRED AT A MOBILITY MANAGEMENT ENTITY (MME) TO SUPPORT A NUMBER OF eNBs/HeNBs IN WIRELESS NETWORKS" filed Jun. 23, 2008, and assigned to the assignee hereof and hereby expressly incorporated by reference herein, Provisional Application No. 61/079,393 entitled "SYSTEMS AND METHODS TO REDUCE ASSOCIATIONS/PORTS AND MULTIPLEX CONNECTIONS BETWEEN eNBs/HeNBs/RELAYS IN WIRELESS SYSTEMS" filed Jul. 9, 2008, and assigned to the assignee hereof and hereby expressly incorporated by reference herein, and Provisional Application No. 61/087,145 entitled "CONCENTRATOR/DISTRIBUTOR FOR A CONTROL PLANE TO HOME BASE STATIONS" filed Aug. 7, 2008, and assigned to the assignee hereof and hereby expressly incorporated by reference herein.

This application is related to commonly owned U.S. patent application Ser. No. 12/487,569 entitled "CONCENTRATOR FOR MULTIPLEXING ACCESS POINT TO WIRELESS NETWORK CONNECTIONS," and U.S. patent application Ser. No. 12/487,571, entitled "CONCENTRATOR FOR MULTIPLEXING ACCESS POINT TO WIRELESS NETWORK CONNECTIONS," the disclosure of which is hereby incorporated by reference herein.

BACKGROUND

1. Field

The following description relates generally to wireless communications, and more particularly to control plane communications with upstream network components and between access points.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc.

Generally, wireless multiple-access communication systems may simultaneously support communication for multiple mobile devices. Each mobile device may communicate with one or more access points (e.g., base stations) via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. In addition, mobile devices can communicate with other mobile devices in peer-to-peer wireless network configurations.

Access points can communicate with additional upstream wireless network components to facilitate providing wireless network access to the mobile devices. In some configurations, the access points can establish connection with a mobility management entity (MME) to provide session and mobility management in the wireless network. MMEs can further communicate with additional upstream network components to authenticate/authorize the mobile devices to communicate over the network and/or to facilitate transmitting/receiving data over the network.

Small scale access points, such as femtocell access points, picocell access points, relay nodes, etc., have been introduced to conventional wireless networks allowing heterogeneous unregulated deployment of new access points. These small scale access points similarly establish connection with MMEs to provide session and mobility management in the wireless networks. MMEs, however, can be limited in the number of supportable connections, both at the transport and application layers. Similarly, some access points can support other small scale access points, providing MME access thereto, and similarly can have limits on the number of concurrently supportable connections especially, for example, where the supporting access point is a picocell or femtocell access point.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with facilitating multiplexing access point connections to mobility management entities (MME) or other access points using a concentrator component. The concentrator component can connect to downstream access points and one or more MMEs or upstream access points. In this regard, the concentrator component can support many downstream access point connections via a single MME or upstream access point connection. In one example, the concentrator component can associate the downstream access points to the MME or upstream access point (or a plurality of such) and forward data received from the downstream access points to the MME(s) or upstream access points.

In another example, for mobile device specific communications, the concentrator component can, for example, create an identifier for the mobile device that is locally unique within itself (e.g., bases on its own identifier and an identifier of the associated downstream access point). The concentrator component can replace the mobile device identifier in related packets with the new identifier before forwarding the packets to the MME or upstream access point. Thus, when a response is received by the concentrator component from the MME or upstream access point, the concentrator component can determine the appropriate downstream access point from the identifier, replace the identifier in the response with the mobile device identifier originally received, and forward the response to the downstream access point for propagating to the appropriate mobile device. In yet another example, the concentrator component can associate downstream access points with a tracking area, which can be a grouping of access points in proximity of one another. In this regard, the concentrator component can broadcast communications received from the MME to the tracking area to mitigate maintaining complex routing at the MME.

According to related aspects, a method is provided that includes receiving a page from a MME comprising a tracking area identifier and determining one or more access points associated with the tracking area identifier based at least in part on a stored mapping of access points to tracking area identifiers. The method also includes transmitting the page to the one or more access points.

Another aspect relates to a wireless communications apparatus. The wireless communications apparatus can include at least one processor configured to receive a page from a MME comprising a tracking area identifier. The at least one processor is further configured to discern one or more access points associated with the tracking area identifier based at least in part on a stored association of access points to tracking area identifiers and transmit the page to the one or more access points. The wireless communications apparatus also comprises a memory coupled to the at least one processor.

Yet another aspect relates to an apparatus that includes means for receiving a page from a MME comprising a tracking area identifier and means for determining one or more access points associated with the tracking area identifier based at least in part on a stored mapping of access points to tracking area identifiers. The apparatus further includes means for transmitting the page to the one or more access points.

Still another aspect relates to a computer program product, which can have a computer-readable medium including code for causing at least one computer to receive a page from a MME comprising a tracking area identifier. The computer-readable medium can also comprise code for causing the at least one computer to determine one or more access points associated with the tracking area identifier based at least in part on a stored mapping of access points to tracking area identifiers. Moreover, the computer-readable medium can comprise code for causing the at least one computer to transmit the page to the one or more access points.

Moreover, an additional aspect relates to an apparatus. The apparatus can include an upstream communication component that receives a page from a MME comprising a tracking area identifier. The apparatus further includes a paging component that determines one or more access points associated with the tracking area identifier based at least in part on a stored mapping of access points to tracking area identifiers and a downstream communication component transmitting the page to the one or more access points.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed and this description is intended to include all such aspects and their equivalents.

DETAILED DESCRIPTION

Figure 1:
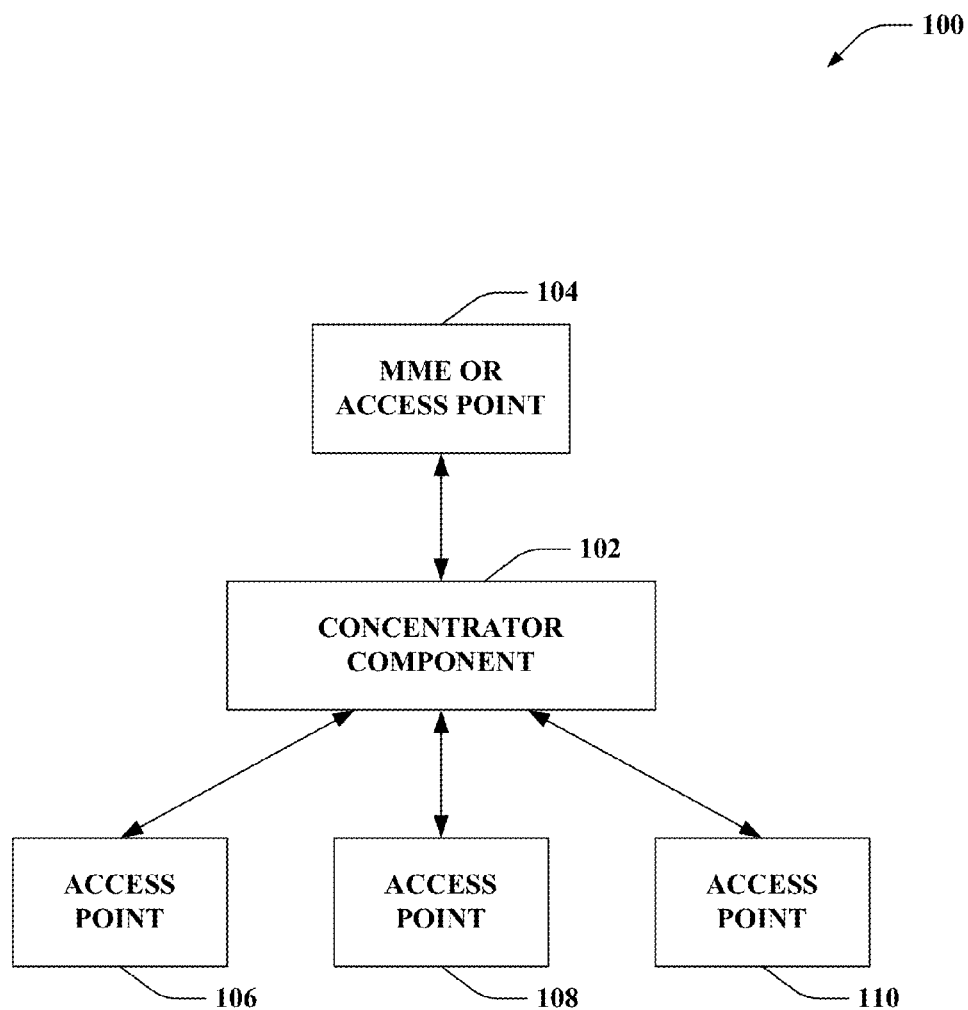
FIG. 1 is an illustration of an example wireless communications system that facilitates multiplexing wireless network communications.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, a wireless communication system 100 is illustrated that facilitates multiplexing multiple access point connections to a single mobility management entity (MME) or upstream access point connection. A concentrator component 102 is provided that connects to an MME or access point 104 as well as various downstream access points 106, 108, and 110 to facilitate communicating therebetween. The MME or access point 104 can be an MME or an access point that communicates with an MME. In addition, though not shown, the concentrator component 102 can connect to multiple MMEs or upstream access points allowing the access points 106, 108, and 110 (or other downstream access points) to communicate with one or more MMEs or upstream access points. In addition, as described further herein, the concentrator component 102 can be transparent to the MME or access point 104 as well as the access points 106, 108, and 110.

According to an example, the concentrator component 102 can establish a transport layer connection (e.g., stream control transmission protocol (SCTP)) along with multiple related application later connections (e.g., S1 application protocol (S1-AP, X2, etc.)) for each access point 106, 108, and 110 with the MME or access point 104. In addition, the access points 106, 108, and 110 can each establish a transport layer connection and corresponding application layer connections with the concentrator component 102. The concentrator component 102 can receive packets from the access points 106, 108, and 110, over the transport and application layer and forward the packets to the MME or access point 104, along with an access point 106, 108, or 110 identifier, over a corresponding application layer connection established over the single transport layer connection. In addition, the MME or access point 104 can indicate access point identifiers in packets transmitted to the concentrator component 102, and the concentrator component can forward the packets to the appropriate access point 106, 108 or 110.

In another example, the concentrator component 102 can communicate with multiple upstream MMEs or access points (e.g., MME or access point 104 and others). In this example, the concentrator component 102 can maintain routing information, such as a routing table, related to the access points 106, 108, 110, and the multiple upstream MMEs or access points. Moreover, in this example, the access points 106, 108, and 110 can connect to multiple MMEs, and the concentrator component 102 can maintain routing information for each MME and forward packets from the access points 106, 108, or 110, using the routing information, to the appropriate MME.

In addition, the concentrator component 102 can act as an MME in some cases handling access point to access point communications, such as handover commands, reset message, and/or the like. For example, a handover command can be received related to access points 106 and 108. Where the access points 106 and 108 are associated with the same upstream MME or access point (e.g., MME or access point 104), the upstream MME or access point need not be notified of the handover, in some cases. In this example, the concentrator component 102 can facilitate the handover from access point 106 to access point 108 (or vice versa), as indicated in the handover command. In another example, however, the concentrator component 102 can swap the access point identifiers in the handover command with its own identifier established with the MME or access point 104 forcing the MME or access point 104 to act as if an access point is handing over to itself. Where, however, the access points involved in the handover command communicate with disparate MMEs, the concentrator component 102 can forward the command to the upstream MME or access point related to appropriate access points to facilitate the handover.

Similarly, the concentrator component 102 can act as an MME in handling reset messages sent from the access points 106, 108, or 110. In this example, the concentrator component 102 can transmit the reset message to the MME or access point 104 serving the access point 106, 108, or 110, as well as to substantially all access points being served by the MME or access point 104. In addition or alternatively, the concentrator component 102 can transmit the reset message to substantially all mobile devices served by the access point 106, 108, or 110 being reset, as described further herein. Moreover, the concentrator component 102 can transmit the reset message to the MME or access point 104, separately for all mobile devices served by one or more of access points 106, 108, or 110 being reset, as described further herein.

In addition or alternatively, in an example, the concentrator component 102 can establish an application layer connection with the MME or access point 104 per mobile device (not shown) connected with a given access point 106, 108, or 110. In this example, the concentrator component 102 can receive uplink packets from an access point 106, 108, or 110 related to a connected mobile device, and can generate an identifier for the mobile device that is unique within the concentrator component 102. For example, the identifier can include an identifier of the mobile device determined from the packet (e.g., or a previous registration) along with the identifier of the associated access point 106, 108, or 110. The concentrator component 102 can replace the mobile device identifier in received packets with the locally unique identifier and transmit the packets to the MME or access point 104.

Downlink packets received from the MME or access point 104 can include the unique identifier used in the uplink packets allowing the concentrator component 102 to identify the associated mobile device and serving access point. In one example, the concentrator component 102 can determine the access point serving the mobile device according to state information stored relating to the unique identifier. In another example, the concentrator component 102 can determine the serving access point based on information stored in or indicated by the unique identifier. In either case, the concentrator component can replace the unique identifier in the downlink packet with the mobile device identifier previously received from the serving access point and can forward the packet to the serving access point for propagation to the appropriate mobile device. In another example, the concentrator component 102 can determine serving access point information in the downlink packet and forward the packet to the serving access point without replacing/changing identifiers in the packet for the propagation to appropriate mobile device.

In addition, the concentrator component 102 can implement paging for tracking areas specified by the access points 106, 108, and 110. For example, the access points 106, 108, and 110 can indicate tracking areas when establishing connection with the concentrator component 102 (and/or the concentrator component 102 can otherwise receive or determine related tracking areas). Where the concentrator component 102 encounters a new tracking area from a connecting access point, it can forward tracking area information to the MME or access point 104 in a configuration update message. The MME or access point 104 can utilize paging by transmitting pages to the concentrator component 102 comprising the tracking identifier. The concentrator component 102 can subsequently transmit the page to substantially all access points associated with the tracking area, allowing the access points to page appropriate mobile devices identified in the page, in one example.

Figure 2:
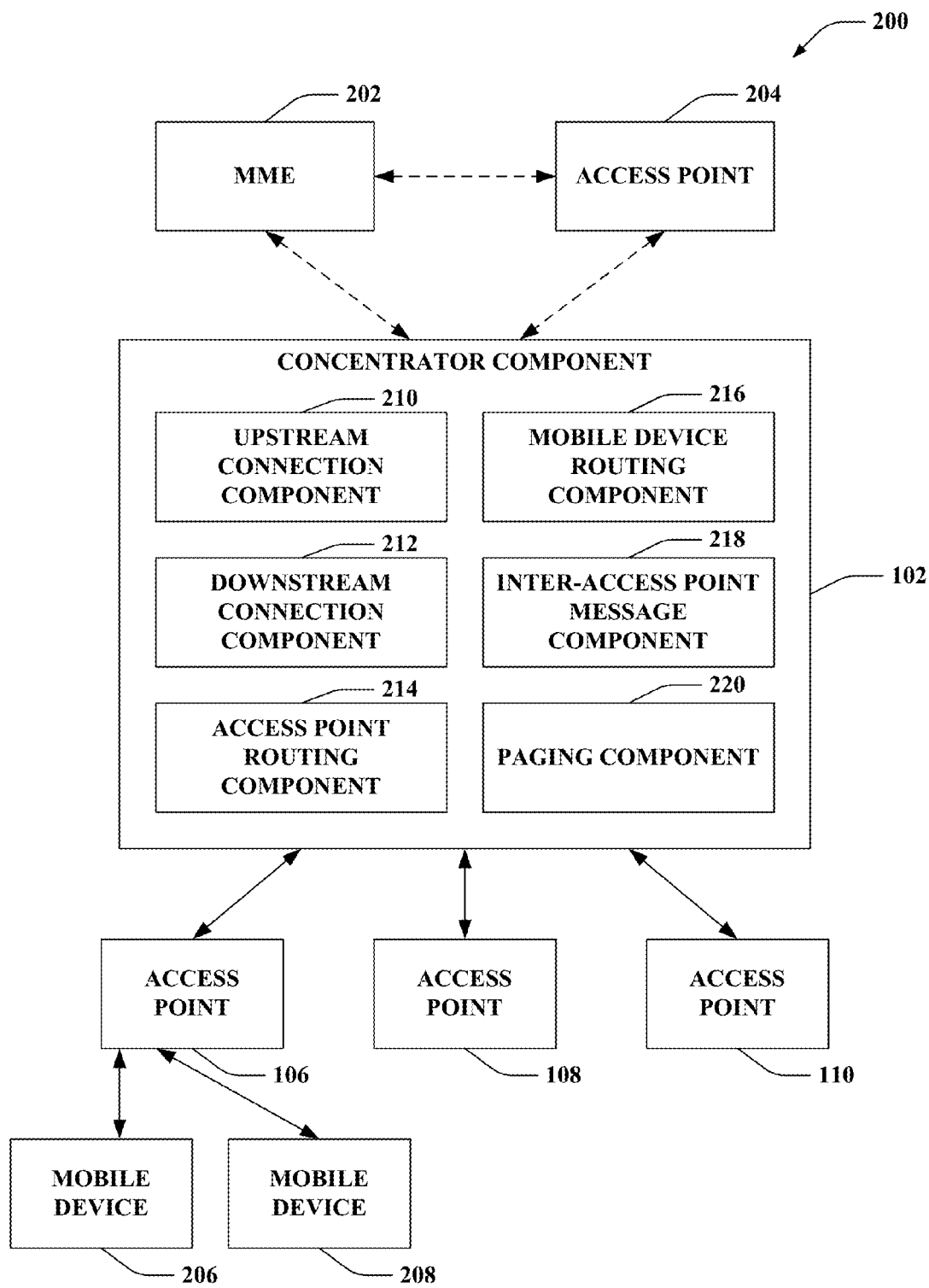
FIG. 2 is an illustration of an example wireless communications system that facilitates multiple access point communication with an upstream network component.

Turning now to FIG. 2, an example wireless communication system 200 that facilitates maintaining multiple access point connections to a given MME or upstream access point is illustrated. A concentrator component 102 is provided that, as described, can connect to multiple access points 106, 108, and 110 facilitating communication with one or more MMEs 202 or upstream access points 204. The upstream access points 204 can connect to the MME 202 or other upstream network components, for example, facilitating communication therewith for the access points 106, 108, and 110 via the concentrator component 102. In addition, mobile devices 206 and 208 can communicate with the access point 106 to receive wireless network access. It is to be appreciated that more mobile devices can so communicate with access point 106 and/or one or more of the upstream access points 108 or 110, for example.

The concentrator component 102 can include an upstream connection component 210 that manages one or more transport layer connections and a plurality of application layer connections with an MME or upstream access point, a downstream connection component 212 that manages transport and application layer connections with a plurality of access points, an access point routing component 214 that maintains state information for a plurality of access points associated with the MME or other upstream access point, a mobile device routing component 216 that maintains state information for a plurality of mobile devices connected to one or more of the plurality of access points, an inter-access point message component 218 that can handle message or packets transmitted between access points connected to the concentrator component 102, and a paging component 220 that sends pages for mobile devices to serving access points based on a related tracking area.

According to an example, the upstream connection component 210 can establish a connection with the MME 202 and/or access point 204. For example, the upstream connection component 210, in one example, can establish a SCTP association with the MME and/or access point 204 allowing a number of application layer (e.g., S1-AP, X2, etc.) connections or streams. During connection establishment, for example, the upstream connection component 210 can receive a unique identifier of the MME 202 (e.g., global unique MME identifier (GUMMEI)) or access point 204 (e.g., eNB global identifier (EGI)) for subsequent use in identifying packets sent therefrom. It is to be appreciated that using such identifiers can be useful when the upstream connection component 210 maintains multiple upstream connections to various MMEs or access points.

In addition, for example, the downstream connection component 212 can establish connections with the access points 106, 108, and 110 upon receiving a corresponding request for access to the concentrator component 102 or to the MME 202 or upstream access point 204 (e.g., the concentrator component 102 can be transparent to the access points, as described). For example, the access points 106, 108, and 110 can setup an SCTP association with the downstream connection component 212, for which the concentrator component 102 takes no action regarding the MME 202 or upstream access point 204. The downstream connection component 212, in one example, can transmit an identifier of the MME 202 (e.g., GUMMEI) or upstream access point 204 (e.g., EGI) to the access points 106, 108, and 110 as if the access points had setup connection directly with the MME 202 or upstream access point 204. Subsequently, the access points 106, 108, and 110 can send an application layer initialization message (e.g., S1-AP or X2 message), received by the downstream connection component 212, to facilitate establishing connection with the concentrator component 102. The upstream connection component 210 can forward the S1-AP/X2 message to the MME 202 and/or upstream access point; in one example, this can be based on information in the message, such as an MME or upstream access point identified in the message. The MME 202 or upstream access point 204 can set up the application layer connection over the SCTP connection with the upstream connection component 210. Thus, for example, if connection between the access points 106, 108, or 110 and downstream connection component 212 fails (e.g., at an application or transport layer), the downstream connection component 212 can close the related application layer connection to the MME 202 or upstream access point 204.

Moreover, as described, the concentrator component 102 can connect to multiple MMEs or upstream access points. In this example, the concentrator component 102 can expose access to the various MMEs or upstream access points allowing downstream access points, such as access points 106, 108, and 110 to select a desired MME or upstream access point. Information regarding selected MMEs or upstream access points can be stored in a routing table in the access point routing component 214, for example. In addition, one or more of the downstream access points can connect to multiple MMEs or upstream access points, in which case the downstream access point can negotiate a connection through the concentrator component 102 using a different IP or other address for each connection. The access point routing component 214 can store the multiple associations, as described further below, based on the IP or other address and other information.

In addition, the access point routing component 214 can store an association between the access point 106, 108, or 110, and the appropriate MME or access point, such as MME 202 or access point 204. The association can be stored, for example, with a GUMMEI of the MME 202 or EGI of the upstream access point 204 received by the upstream connection component 210 (and/or indicated in the access point initialization request) and an identifier related to the appropriate access point 106, 108, or 110, which can be received by the downstream connection component 212 in the transport layer and/or application layer setup request. This can be an EGI, as described, which locally identifies the access point 106, 108, or 110. In addition, the access point routing component 214 can associate the access point identifier with an IP address of the access point. In one example, the downstream connection component 212 can receive packets from the access points 106, 108, and 110, which include the identifier of the access point in each packet for example, and the access point routing component 214 can determine a destination MME or upstream access point based on information in the packet and/or based on an association between the access point identifier or IP address and MME identifier stored in the access point routing component 214. In either case, the access point routing component 214 can forward the packet to the upstream connection component 210 for propagating to the appropriate MME or upstream access point, for example.

Upon receiving packets from the MME 202 or access point 204, the upstream connection component 210 can query the access point routing component 214 to determine one or more appropriate access points to receive the packets. In one example, the upstream connection component 210 can obtain the MME or upstream access point identifier related to the packet and/or an access point identifier related to the downstream access point (such as the EGI, as described above) that locally identifies the access point to receive the packets. In one example, the downstream access point identifier can be determined based on another identifier in the downlink packet as received by the MME 202 or access point 204 and an entry in a routing table of the access point routing component 214 that associates the other identifier to the access point identifier received during setup. The downstream connection component 212 can forward the packets to the appropriate access point based on the identifier. Where the downstream access point is associated to a plurality of MMEs or upstream access points, the downstream connection component 212 can further forward the packets to the downstream access point based on the MME or upstream access point identifier. Thus, for example, the downstream access point, such as access points 106, 108, or 110, can initialize multiple transport and/or application layer connections with the downstream connection component 212—one or more for each MME or upstream access point connection. In this regard, access point routing component 214 can determine over which connection to forward the packets to the downstream access point based on the MME or upstream access point identifier and the downstream access point identifier.

In another example, access point 106 can provide network access to mobile devices 206 and 208. In this regard, the downstream connection component 212 can receive mobile device specific packets from access point 106. Upon receiving an initial packet, the upstream connection component 210 can establish an application layer connection over the transport layer connection with the MME 202 or upstream access point 204 for the mobile device 206 or 208. In addition, mobile device routing component 216 can extract an identifier related to the mobile device 206 or 208 and/or an identifier related to the access point 106. In an example, the mobile device identifier can be assigned by the access point 106, specified in an uplink packet from the mobile device 206 or 208, and/or the like. The mobile device routing component 216 can generate a unique identifier related to the identifier of the access point 106 and mobile device 206 or 208—indeed, the unique identifier can comprise both identifiers—and replace the identifier in the received packet with the unique identifier. Subsequently, the upstream connection component 210 can communicate the packet to an appropriate MME 202 or upstream access point 204 using the created application layer connection. Similarly, the desired MME or upstream access point can be indicated in the packet from the access point 106, in one example, and/or the upstream connection component 210 can communicate the packet to an MME or upstream access point previously associated with the access point 106.

In addition, the upstream connection component 210 can receive downlink packets from the MME 202 or upstream access point 204 relating to the mobile devices 206 and 208, or other mobile devices. The mobile device routing component 216 can determine an access point and connected mobile device to which the downlink packets relate based on the unique mobile device identifier in the packet. For example, where stored as an association (e.g., added or inserting into a routing table), the mobile device routing component 216 can match the unique identifier to a mobile device identifier, such as for mobile device 206 or 208, and associated access point identifier, such as for access point 106. In another example, where the unique identifier is composed of the mobile device and access point identifiers, the mobile device routing component 216 can discern the identifiers from the unique identifier. In either case, the mobile device routing component 216 can additionally replace the unique identifier in the packet with the determined mobile device identifier, and the downstream connection component 212 can forward the packet to the appropriate access point based on the access point identifier.

In yet another example, the inter-access point message component 218 can perform similar functions as an MME in communicating messages among access points served by the concentrator component 102. For example, where two access points, such as access point 106 and 108, are associated with the same MME 202 or upstream access point 204, the inter-access point message component 218 can facilitate communications between the access points 106 and 108. In one example, access point 106 can transmit a handover or cell reselection command, which is received by the downstream connection component 212, to facilitate handing over communication from mobile device 206. The downstream connection component 212 can detect the handover command and determine the source access point 106 and target access point 108. If the access points 106 and 108 are associated with the same MME or upstream access point, which can be determined from the access point routing component 214, as described, the inter-access point message component 218 can forward the handover command to the access point 108 via downstream connection component 212. Thus, the MME or upstream access point need not be involved in the handover; however, it is to be appreciated that the concentrator component 102 can notify the MME or upstream access point (e.g., MME 202 or access point 204) of the handover, in an example.

In another example, however, the inter-access point message component can replace the source and target access point identifiers in the handover command with the identifier of the concentrator component 102 and forward the command to the appropriate MME or upstream access point. In this regard, the MME (e.g., MME 202) or upstream access point (e.g., access point 204) can treat the concentrator component 102 as if handing over to itself, causing the concentrator component 102 to forward handover information from/to the appropriate access points 106 and 108. In another example, the inter-access point message component 218 can appropriately handle reset messages received from the access points 106, 108, or 110 via the downstream connection component 212. For example, the downstream connection component 212 can receive a reset command from the access point 106, and the inter-access point message component 218, in one example, can forward the message to related MMEs and/or upstream access points, as indicated by the access point routing component 214, utilizing the upstream connection component 210. In addition, the inter-access point message component 218 can relay the reset message to substantially all access points associated with the same MME or upstream access point, as determined by the access point routing component 214. Moreover, the downstream connection component 212, in one example, can send related reset messages to mobile devices served by the access point, as indicated in the mobile device routing component 216. Alternatively, for example, the downstream connection component 212 can receive a reset command from the access point 106, and the mobile device routing component 216, in one example, can send reset message for each UE served by the access point 106 to the related MMEs 202 and/or upstream access points 204.

It is to be appreciated that the MME 202 or upstream access point 204 can also transmit a reset message, which can be received by the upstream connection component 210. Accordingly, the access point routing component 214 can notify associated access points by transmitting a reset message using downstream connection component 212, for example. In yet another example, the paging component 220 can transmit paging messages, related to served mobile devices, to the access points 106, 108, or 110 based on a tracking area associated therewith. In this example, when establishing connection with the concentrator component 102, access points 106, 108, and 110 can transmit tracking area information in connection establishment requests. The paging component 220 can store the tracking area information associated with the access points 106, 108, and 110. If a new tracking area is defined (e.g., one that is not stored with the information in the paging component 220), the paging component 220 can send a configuration update message to associated MMEs, such as MME 202, or upstream access points, such as access point 204. In this regard, the MME 202 and/or upstream access point 204 can send paging messages to substantially all mobile devices in a tracking area by transmitting the message to the upstream connection component 210. The paging component 220 can forward the message to access points based on the tracking area identified in the message, and access points related to the tracking area, as stored in the paging component 220, for example. It is to be appreciated that the paging component 220 can additionally or alternatively implement a stateless design as well where it forwards paging messages received to substantially all access points connected to the concentrator component 102, and the access points can determine whether the message applies based on a tracking identifier store in the message.

Figure 3:
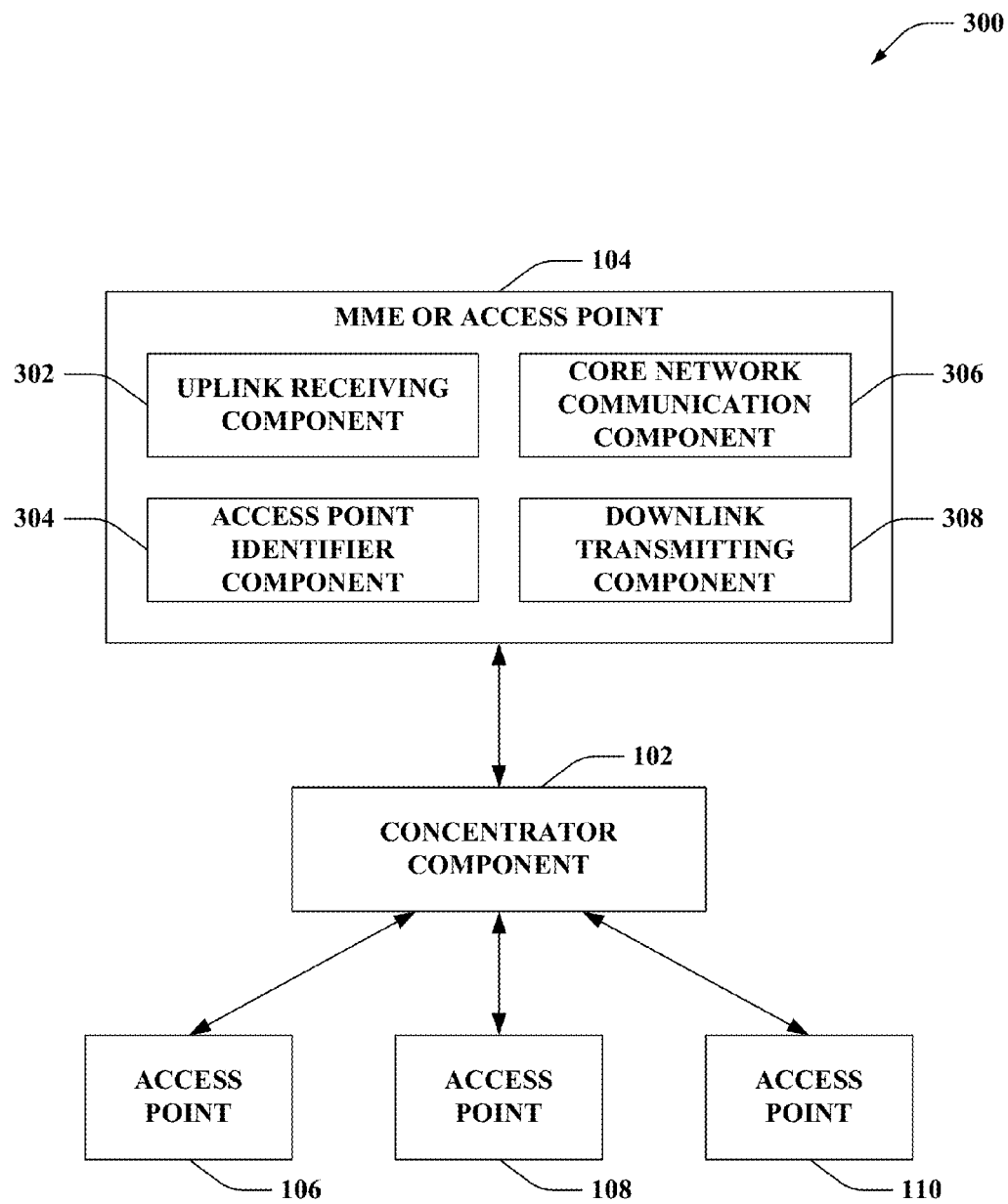
FIG. 3 is an illustration of an example wireless communications system that facilitates identifying access points related to communicating with an upstream network component.

Turning to FIG. 3, an example wireless communication system 300 that facilitates providing multiple access points with MME or upstream access point communication over single transport layer connection is depicted. A concentrator component 102 is provided that establishes a transport layer connection to an MME or access point 104 to facilitate communicating therewith, and establishes transport and application layer connections with a plurality of access points 106, 108, and 110. The concentrator component 102, as described, establishes application layer connections with the MME or upstream access point 104 for the access points 106, 108, and 110 to facilitate wireless network access. In addition, the concentrator component 102 can support multiple MMEs or upstream access points, as described. The access point 106 can establish a connection to the concentrator component 102 and provide an identifier for use in subsequent communication with the MME or access point 104, as described.

The MME or access point 104 can comprise an uplink receiving component 302 that can obtain requests from the concentrator component 102 (e.g., on behalf of an access point 106, 108, or 110, and/or a mobile device communicating therewith), an access point identifier component 304 that can determine an identifier associated with uplink packets from the concentrator component 102, a core network communication component 306 that can transmit and receive data to/from a core wireless network, and a downlink transmitting component 308 that can communicate with data to the concentrator component 102 for transmittal to one or more access points.

According to an example, the concentrator component 102 can setup a connection to the MME or access point 104, receiving an identifier associated therewith in one example. One or more of the access points 106, 108, and 110 can establish connection with the concentrator component 102 to ultimately receive access to the MME or access point 104, as described, and the concentrator component 102 can setup an application layer connection with the MME or access point 104 for the access points 106, 108, and 110. Subsequently, the access points 106, 108, and 110 can transmit packets to the concentrator component 102 comprising an identifier specified in the setup. As described, this can be an access point identifier (e.g., EGI), part of an identifier of a served mobile device, and/or the like. In addition, as described in one example, the concentrator component 102 can, in one example, replace the identifier with an identifier unique within the concentrator component 102, such as an association of the access point identifier to the mobile device identifier where both are present.

In any case, the concentrator component 102 can send the uplink packet to the MME or access point 104, and the uplink receiving component 302 can obtain the uplink packet. The access point identifier component 304 can, for example, determine the identifier associated with the packet, and the core network communication component 306 can transmit the request to a core wireless network (not shown). It is to be appreciated that the identifier can be included in the request or otherwise associated so that the core network communication component 306 can associate response packets with the identifier. It is to be additionally appreciated that no request is required for receiving packets at the core network communication component 306 (e.g., from the core wireless network) for transmitting to one or more access points 106, 108, or 110. For example, the core network can send paging message packets to the core network communication component 306 for forwarding to the access points 106, 108, or 110, without first receiving a request.

Upon receiving a downlink packet from the core network, the core network communication component 306 can determine an access point associated with the downlink packet. This can be based on an identifier or context in the downlink packet, which can be an identifier or context sent in a related uplink packet by the core network communication component 306, as described. The downlink transmitting component 308 can associate the appropriate access point identifier with the downlink packet, if different from the identifier specified in the downlink packet from the core network for example, and can provide the response to the concentrator component 102. For example, the downlink transmitting component 308 can insure that substantially all packets transmitted to the concentrator component 102 have an associated access point identifier. As described, the concentrator component 102 can also replace the identifier in the packet, for example, where the packet relates to a mobile device served by the access point. The concentrator component 102 can provide the downlink packet to the appropriate access point 106, 108, and/or 110 based on the identifier, as described previously.

The MME or access point 104 can support not only regular direct transport layer connections from access points, but also the transport layer connection from the concentrator component 102. It is to be appreciated that the transport layer connection from the concentrator component 102 can be different from conventional direct connections with access points in that the concentrator component 102 connection can support multiple application layer connections over the single transport layer connection or association, as described.

Figure 4:
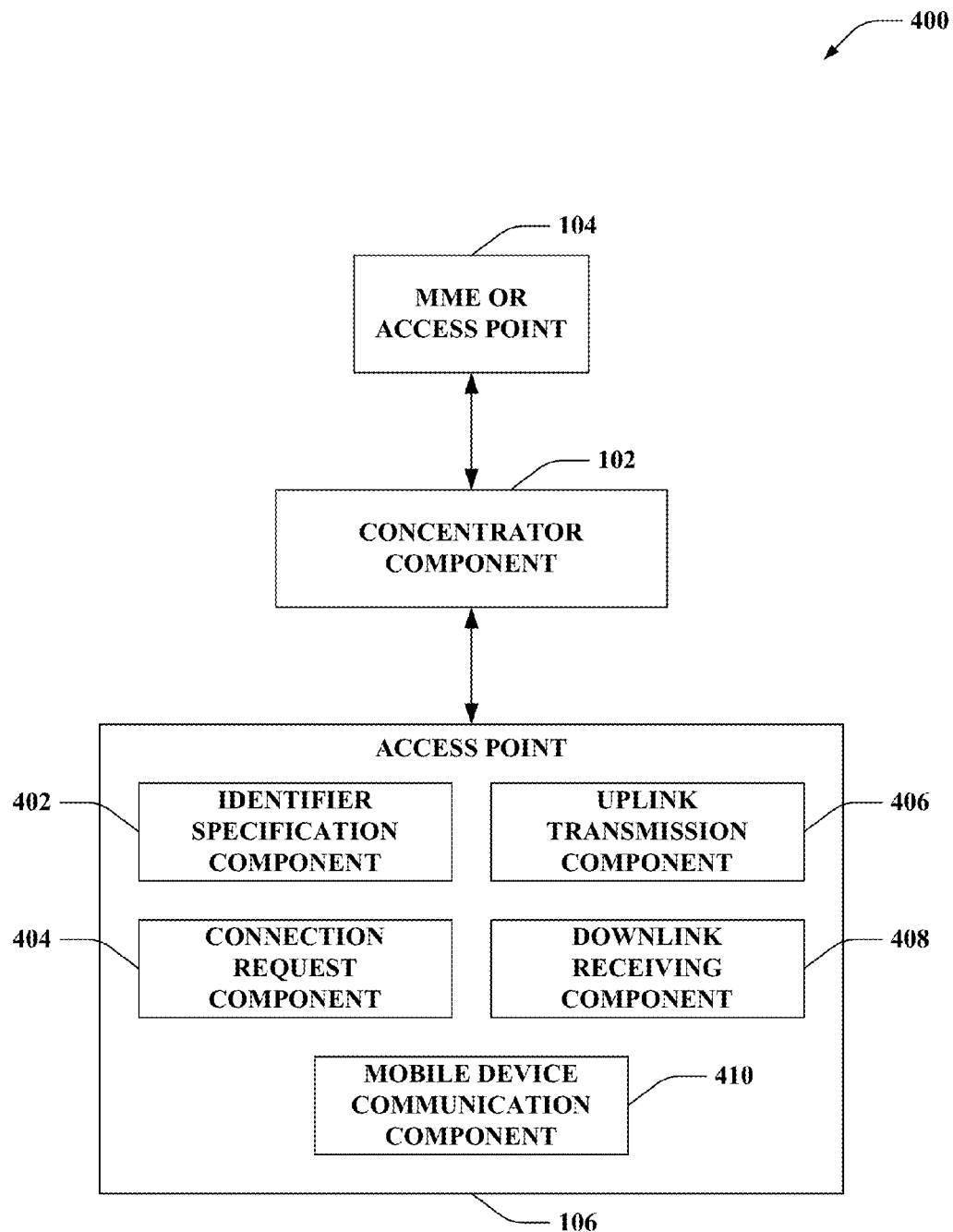
FIG. 4 is an illustration of an example wireless communications system that facilitates providing identification of an access point.

Referring to FIG. 4, an example wireless communications system 400 is illustrated that multiplexes access point connections to an MME or upstream access point over a single transport layer connection. System 400 includes a concentrator component 102 that can provide MME or upstream access point 104 access to a plurality of access points, such as access point 106, as described. In particular, the access point 106 can associate an identifier during setup and for employment in each subsequent packet transmission to the concentrator component 102. As described, this allows the concentrator component 102 to associate packets to the access point 106 when transmitting to or receiving from the MME or access point 104. Where the MME or access point 104 sends downlink packets to the concentrator component 102, for example, the identifier can be used in this regard as well to associate the downlink packets with the access point 106.

The access point 106 can comprise an identifier specification component 402 that can generate or otherwise obtain an identifier to be utilized in transmitting uplink packets to the concentrator component 102, a connection request component 404 that can establish a connection with the concentrator component 102, as described, an uplink transmission component 406 that can transmit uplink packets to the concentrator component 102, a downlink receiving component 408 that can receive downlink packets from the concentrator component 102, and a mobile device communication component 410 that can provide wireless network access to one or more mobile devices (not shown).

According to an example, the concentrator component 102, as described, can establish a transport layer connection with the MME or access point 104. As described, for example, the concentrator component 102 can be transparent to the access point 106, such that the access point 106 functions as if it is connecting directly to the MME or upstream access point 104. The identifier specification component 402 can generate or obtain an identifier related to the access point 106, for example, and the connection request component 404 can formulate a request for access to the MME or access point 104 specifying the identifier. The connection request component 404 can transmit the request for access to the concentrator component 102, which can store the identifier, and/or an association related to the identifier as described, and establish an application level connection with the MME or access point 104 related to the access point 106.

The uplink transmission component 406 can provide uplink packets to the concentrator component 102 and can specify the access point identifier from the identifier specification component 402 in each packet. As described, this allows the concentrator component 102 to identify the access point for subsequent transmission of the uplink packet to the corresponding MME or access point 104 and to identify any responses received from the MME or access point 104 related to the uplink packet. In an example, such a response can be received by the concentrator component 102 in a downlink packet. As described, the concentrator component 102 can determine the related access point 106 and forward the downlink packet to the downlink receiving component 408. The downlink receiving component 408 can ensure the packet is appropriately delivered based on a variety of factors, including the identifier utilized, whether the packet contents is an acceptable or expected response to a previous request, and/or the like.

In addition, the mobile device communication component 410 can provide wireless network access to one or more mobile devices via the access point 106. In this example, the mobile device communication component 410 can receive uplink packets from the mobile device. The identifier specification component 402 can assign an identifier to the mobile device, for example, which is locally unique to the access point 106. This assignment can occur on connection establishment with the mobile device, in one example. The uplink transmission component 406 can transmit uplink packets to the concentrator component 102 along with the identifier assigned to the mobile device by identifier specification component 402. In one example, the identifier for the mobile device can be received in the uplink packet from the mobile device instead of assigned by the identifier specification component 402. In either case, the identifier can be used in subsequent communications between the mobile device and access point 106, as described.

In either case, the concentrator component 102 can create a locally unique identifier based on the access point and mobile device identifier upon receiving the packet and can utilize the unique identifier instead of original mobile device identifier in communicating with the MME or access point 104, as described. The concentrator component 102 can also receive downlink packets from the MME or access point 104 related to the mobile device and can forward these packets to the access point 106 (e.g., based on the locally unique identifier) replacing the locally unique identifier with the mobile device identifier originally presented to the concentrator component 102. It is to be appreciated that the concentrator component 102 can also use the access point identifier, if present, to forward these downlink packets to the appropriate access point. The downlink receiving component 408 can determine a corresponding mobile device for the downlink packet based on the identifier, and the mobile device communication component 410 can forward the downlink packet to the mobile device, for example.

Figure 5:
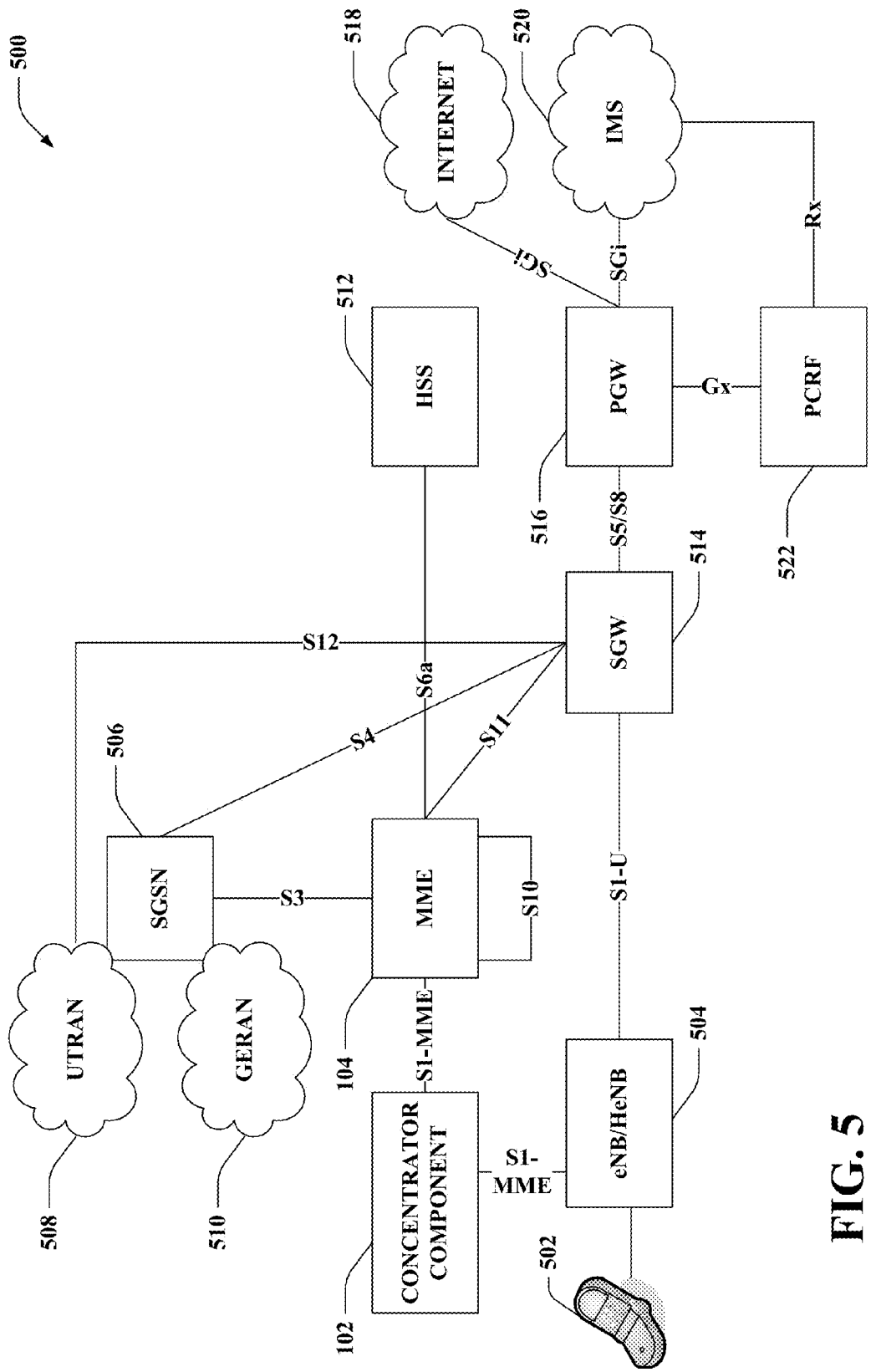
FIG. 5 is an illustration of an example wireless network for providing multiplexed access point communication with a mobility management entity (MME).

Now turning to FIG. 5, an example wireless communication network 500 that utilizes a concentrator component to provide multiplexing for access points accessing an MME is illustrated. Network 500 can include a mobile device 502 receiving network access from a eNB/home eNB (HeNB) 504, which can refer to a small scale access point, such as a femtocell access point, picocell access point, relay node, etc., or a macrocell access point, in one example. The network access can be of substantially any specification, such as E-UTRA, UBM, WiMAX, etc. The HeNB 504, as described, can communicate with the concentrator component 102 using an S1-MME interface on behalf of the mobile device 502 or otherwise, and can accordingly provide access point and/or mobile device identifiers to allow the concentrator component 102 to track communications with the MME 104, using S1-MME interface, as described herein. The MME 104, as described, can communicate with a core network.

The core network includes the various other components. For example, the MME 104 can communicate with a serving general packet radio service (GPRS) support node (SGSN) over an S3 specification to receive access to a UTRA network 508 and/or a GSM edge radio access network (GERAN) 510. MME 104 can connect to a home subscriber server (HSS) 512 over an S6a specification, to get subscriber information, for example.

In another example, the eNB/HeNB 504 can communicate with a serving gateway (SGW) 514 over an S1-U interface to receive access to the internet 518 and/or an IP multi subsystem (IMS) 520 and/or other IP systems. In another example, the eNB/HeNB 504 can so connect via the concentrator component 102, which communicates with the MME or eNB/HeNB 104, as described. The MME 104 can establish connection with the SGW 514 over an S11 interface, through the SGSN 506 using an S4 interface, and/or via the UTRA network 508 over an S12 interface. In any case, the SGW facilitates network access by communicating with a packet data network (PDN) gateway (PGW) 516 over an S5/S8 interface, and the PGW 516 can communicate directly with the internet 518 or IMS 520 using an SGi interface, or via policy charging and rules function (PCRF) 522 over a Gx interface. In the latter example, the PCRF 522 can communicate with the IMS 520 over an Rx interface.

Figure 6:
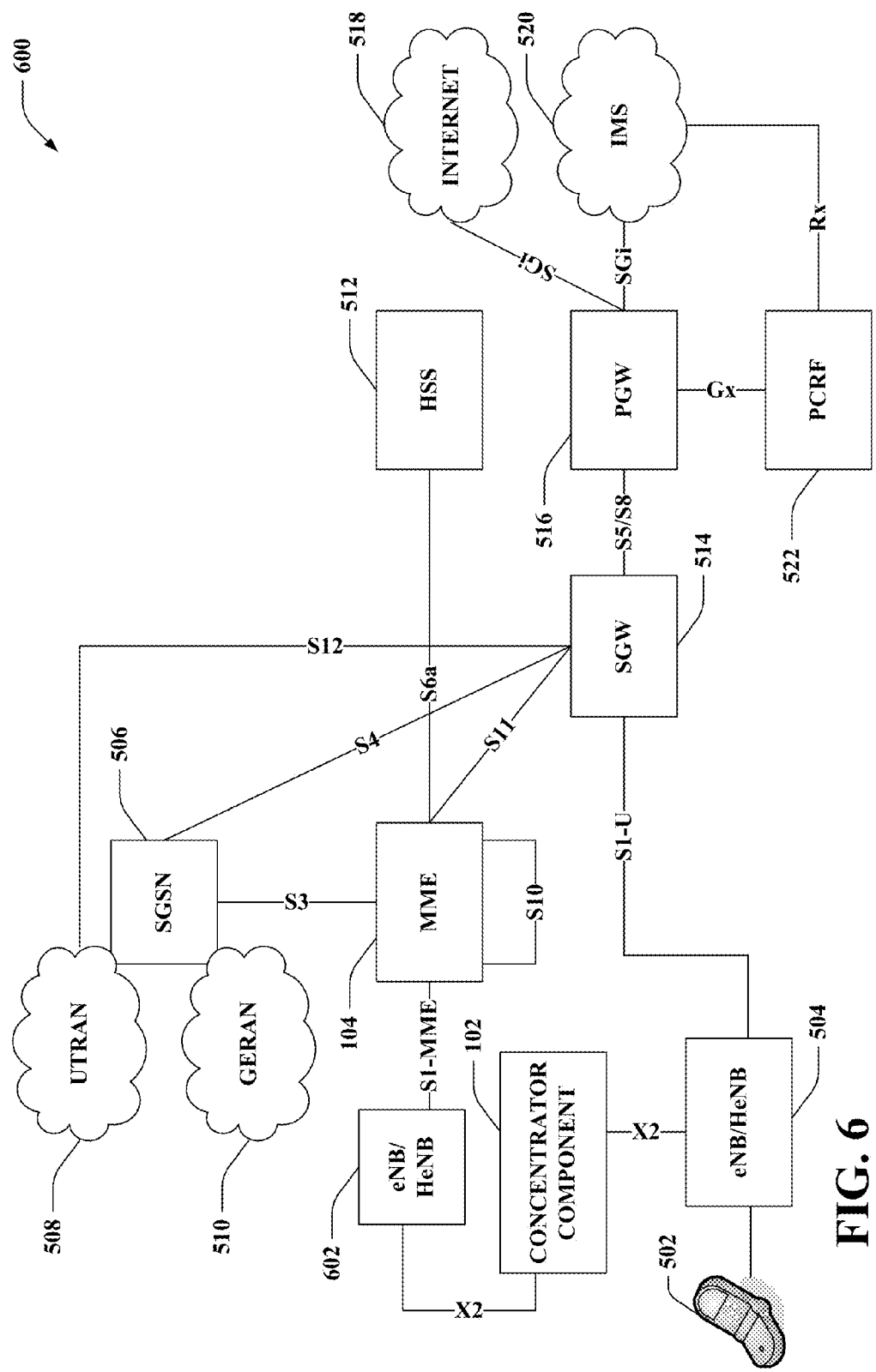
FIG. 6 is an illustration of an example wireless network for providing multiplexed access point communication with an upstream access point.

Now turning to FIG. 6, an example wireless communication network 600 that utilizes a concentrator component to provide multiplexing for access points accessing a disparate access point is illustrated. Network 600 can include a mobile device 502 receiving network access from a eNB/HeNB 504, which can refer to a small scale access point, such as a femtocell access point, picocell access point, relay node, etc., or a macrocell access point, in one example. The network access can be of substantially any specification, such as E-UTRA, UBM, WiMAX, etc. The HeNB 504, as described, can communicate with the concentrator component 102 using an X2 interface on behalf of the mobile device 502 or otherwise, and can accordingly provide access point and/or mobile device identifiers to allow the concentrator component 102 to track communications with the eNB/HeNB 602, using X2 interface, as described herein. The eNB/HeNB 602, as described, can communicate with an MME 104, over an S1-MME interface, which can communicate with a core network.

The core network includes the various other components. For example, the MME 104 can communicate with a serving general packet radio service (GPRS) support node (SGSN) over an S3 specification to receive access to a UTRA network 508 and/or a GSM edge radio access network (GERAN) 510. MME 104 can connect to a home subscriber server (HSS) 512 over an S6a specification, to get subscriber information, for example.

In another example, the eNB/HeNB 504 can communicate with a serving gateway (SGW) 514 over an S1-U interface to receive access to the internet 518 and/or an IP multi subsystem (IMS) 520 and/or other IP systems. In another example, the eNB/HeNB 504 can so connect via the concentrator component 102, which communicates with the eNB/HeNB 602, as described. The eNB/HeNB 602 can connect to a related MME 104, which can establish connection with the SGW 514 over an S11 interface, through the SGSN 506 using an S4 interface, and/or via the UTRA network 508 over an S12 interface. In any case, the SGW facilitates network access by communicating with a packet data network (PDN) gateway (PGW) 516 over an S5/S8 interface, and the PGW 516 can communicate directly with the internet 518 or IMS 520 using an SGi interface, or via policy charging and rules function (PCRF) 522 over a Gx interface. In the latter example, the PCRF 522 can communicate with the IMS 520 over an Rx interface.

Referring to FIGS. 7-13, methodologies relating to facilitating multiplexing communications between access points and upstream access points or MMEs are illustrated. While, for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 7:
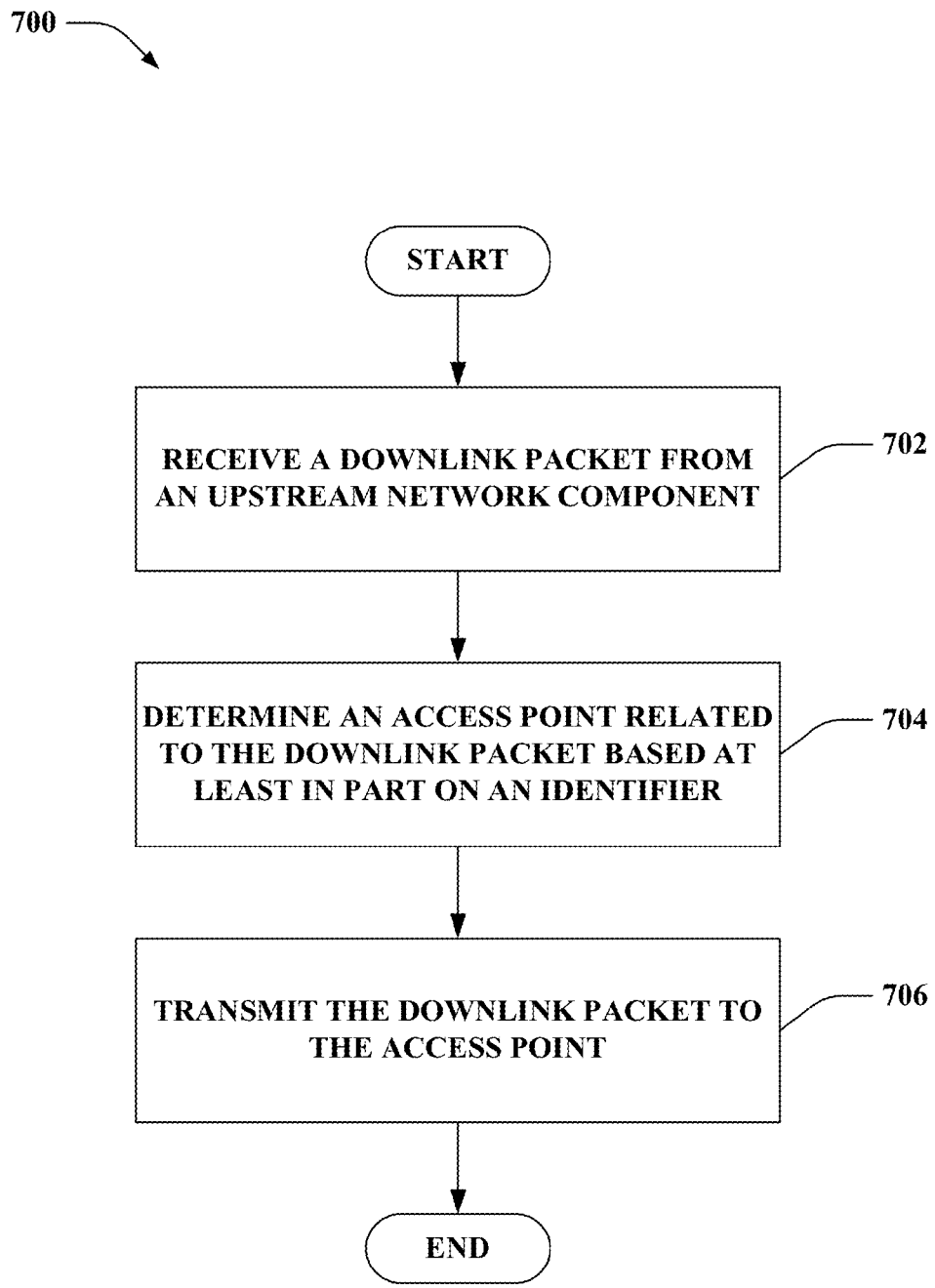
FIG. 7 is an illustration of an example methodology that transmits packets to an access point based on an identifier in the packets.

Turning to FIG. 7, an example methodology 700 that facilitates routing packets between access points and upstream network components is illustrated. At 702, a downlink packet can be received from an upstream network component. In an example, the upstream network component can be an access point, MME, and/or the like. At 704, an access point related to the downlink packet can be determined based at least in part on an identifier. As described, the identifier can be locally unique such that the identifier can have been generated and provided to the upstream network component for utilization in transmitting packets to be received for the corresponding access point. In one example, the locally unique identifier can be stored in a mapping with a received identifier so that the packet can be properly associated with the access point. In an example, the identifier can relate to one of multiple connections from the access point and can be generated to identify one of the connections. Though a generated identifier can be utilized, as described, it is to be appreciated that the received identifier can be utilized in another example. At 706, the downlink packet can be transmitted to the access point.

Figure 8:
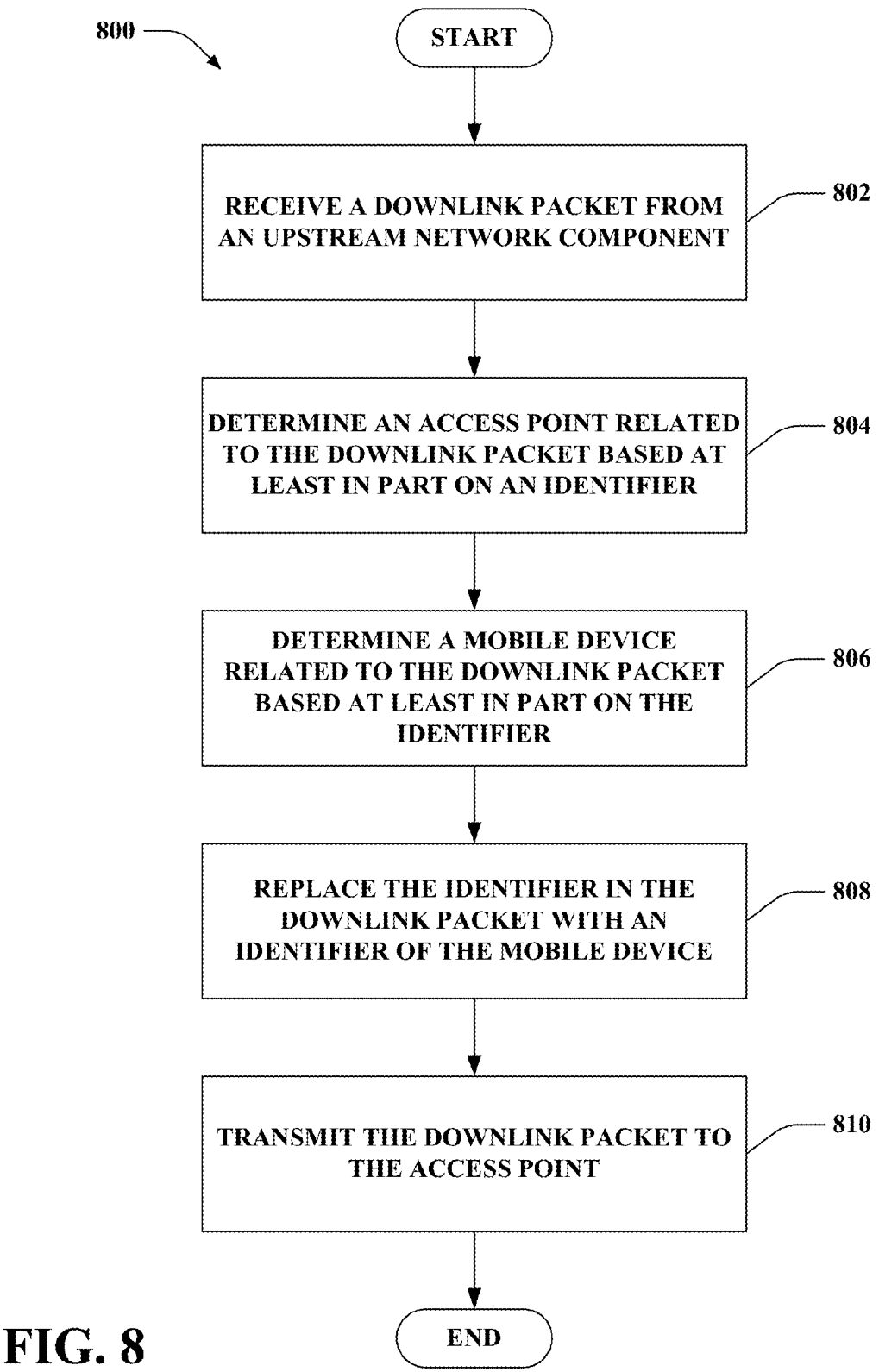
FIG. 8 is an illustration of an example methodology that replaces identifiers in packets with mobile device identifiers and forwards the packets to related access points.

Referring to FIG. 8, an example methodology 800 is shown that facilitates transmitting downlink packets to access points for receipt by corresponding mobile devices. At 802, a downlink packet can be received from an upstream network component. The downlink packet, as described, can comprise a locally unique identifier previously generated for identifying packets related to an access point and mobile device. At 804, an access point related to the downlink packet can be determined based at least in part on the identifier. This can be the locally unique identifier, as described, which is associated with the access point based on a mapping of the locally unique identifier to an identifier received from the access point, the locally unique identifier comprising the received identifier, and/or the like. Similarly, at 806, a mobile device related to the downlink packet can be determined based at least in part on the identifier. Thus, for example, a mapping can match the locally unique identifier to corresponding access point and mobile device identifiers, or such can be determined from the locally unique identifier itself, as described. At 808, the identifier in the downlink packet can be replaced with the determined identifier of the mobile device, and the packet can be transmitted to the access point at 810. This, for example, allows the access point to provide the packet to the corresponding mobile device providing seamless multiplexing of mobile device related packets from access points to upstream network components.

Figure 9:
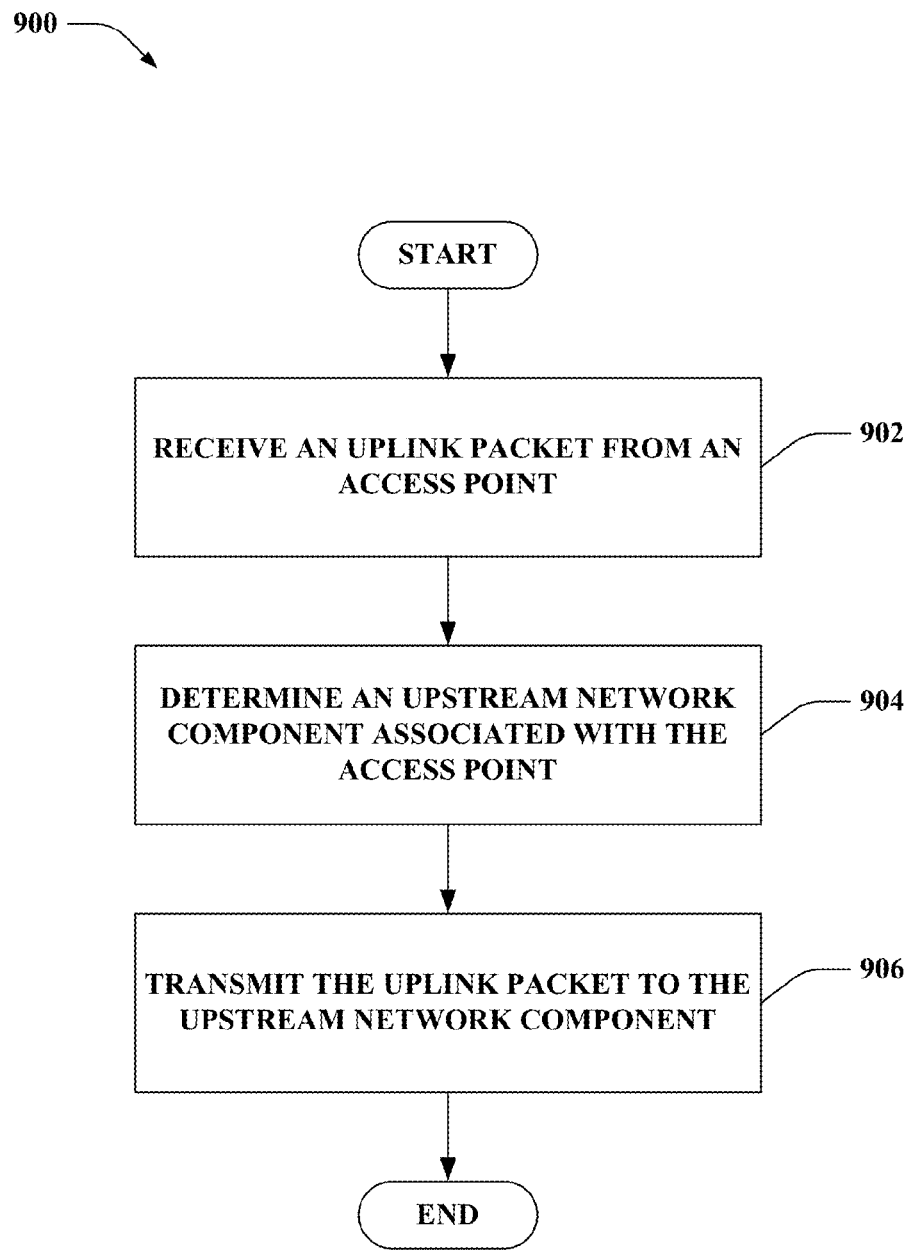
FIG. 9 is an illustration of an example methodology that transmits uplink packets to corresponding upstream network components.

Turning to FIG. 9, an example methodology 900 that facilitates routing packets between an upstream network component and one or more access points is illustrated. At 902, an uplink packet is received from an access point. At 904, an upstream network component associated with the access point is determined. This can be determined, for example, based on a mapping of the access point to the upstream network component, which can be initialized based on a previous setup request. In another example, the uplink packet can specify an upstream network component. At 906, the uplink packet can be transmitted to the upstream network component, as described.

Figure 10:
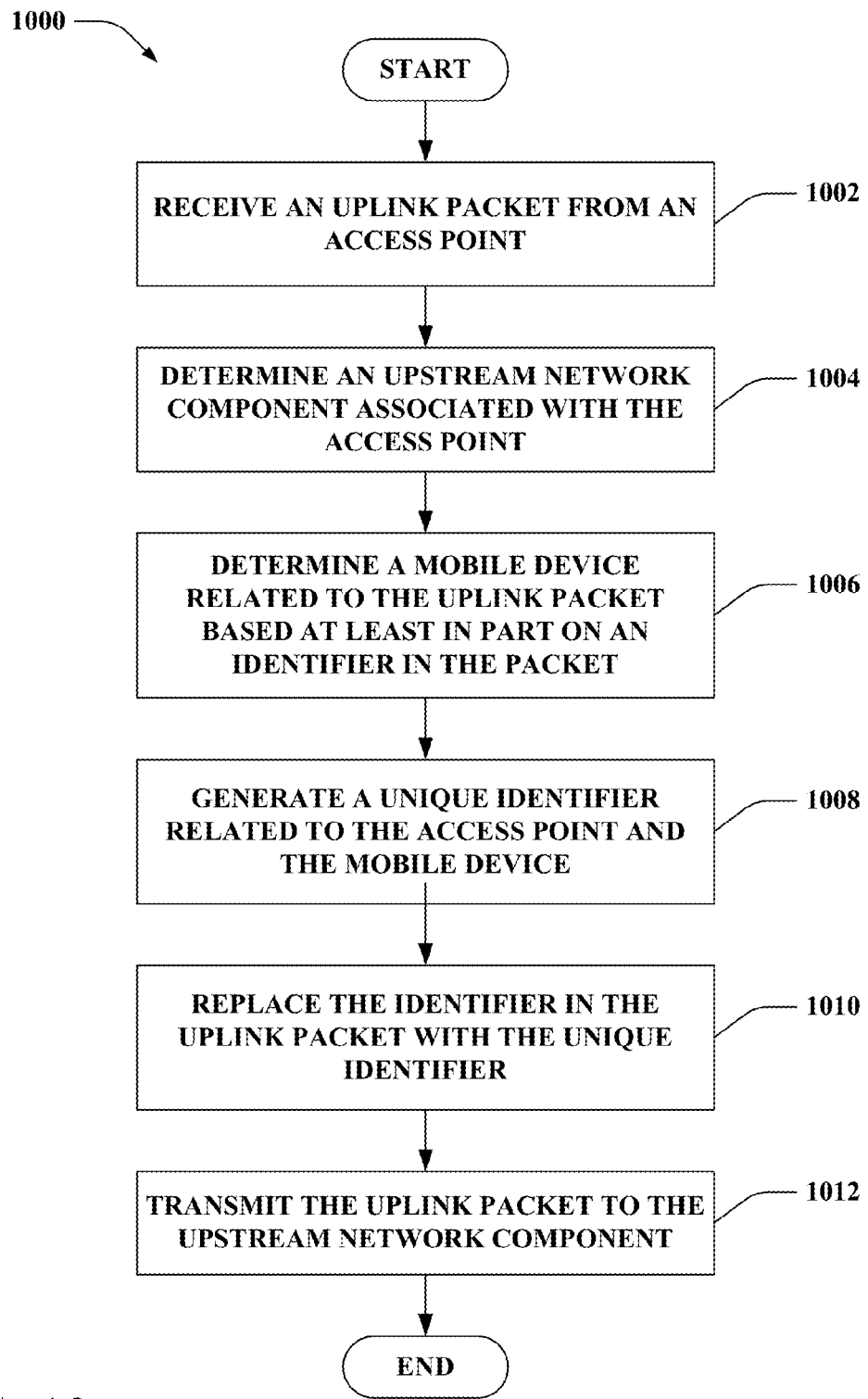
FIG. 10 is an illustration of an example methodology that replaces identifiers in packets with mobile device identifiers and forwards the packets to corresponding upstream network components.

Referring to FIG. 10, an example methodology 1000 is shown that facilitates transmitting uplink packets with generated locally unique identifiers. At 1002, an uplink packet can be received from an access point. As described, the packet can include a locally unique identifier. At 1004, an upstream network component associated with the access point can be determined. This can be from a previous indication, a mapping or routing table storing identifiers of the access point and related upstream network component, and/or the like, as described. At 1006, a mobile device related to the uplink packet can be determined based at least in part on an identifier in the packet. A unique identifier related to the access point and the mobile device can be generated at 1008. As described, the unique identifier can comprise the identifiers of the mobile device and the access point or can be related in a routing table or similar association. At 1010, the mobile device identifier in the packet can be replaced by the unique identifier, and the uplink packet can be transmitted to the upstream network component at 1012. As described in previous figures, subsequent packets can be received from the upstream network component with the unique identifier, and the related access point and mobile device can be discovered based on the unique identifier.

Figure 11:
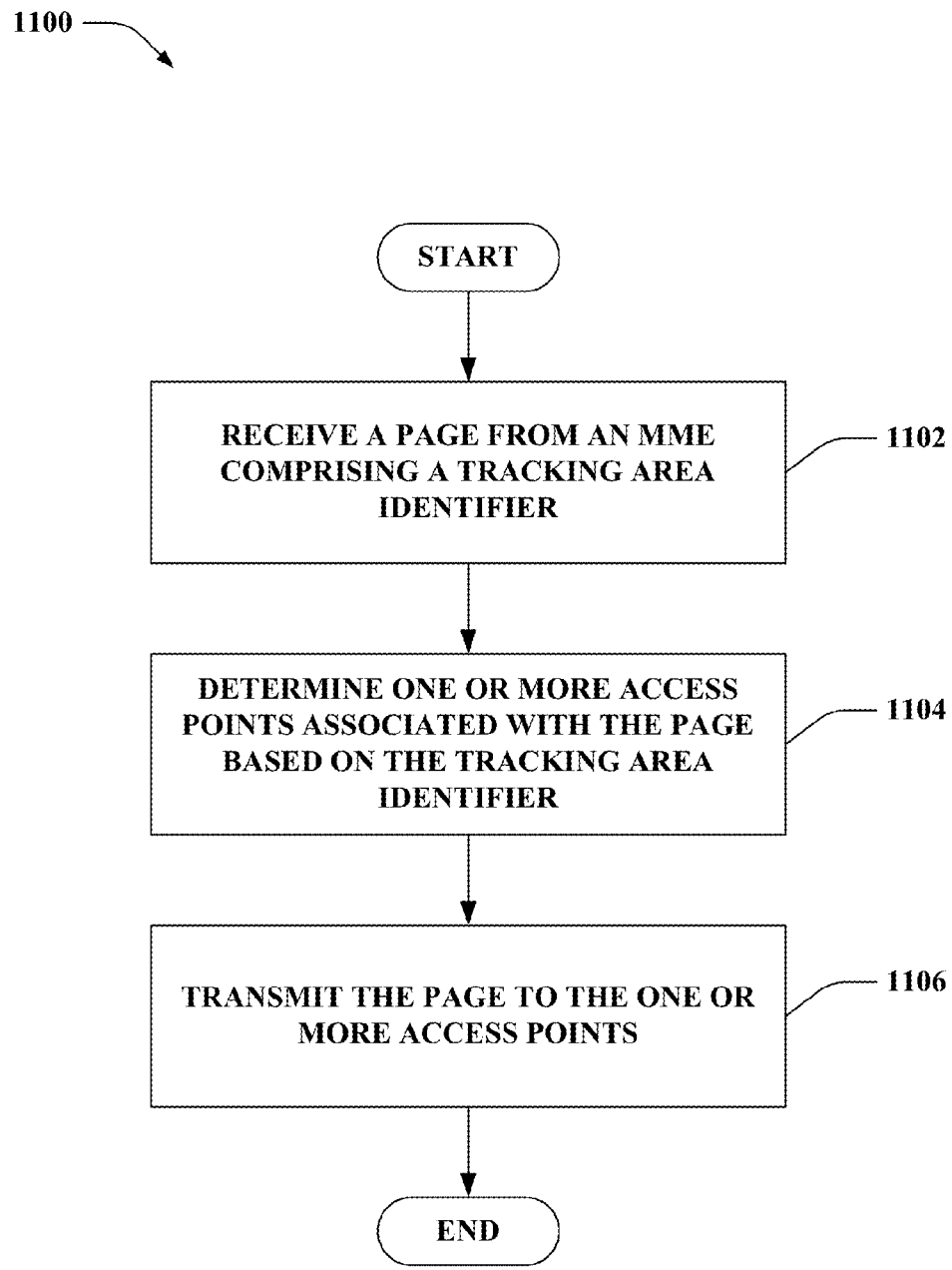
FIG. 11 is an illustration of an example methodology that implements paging in a multiplexing environment for access point communication.

Turning to FIG. 11, an example methodology 1100 that facilitates implementing paging for a plurality of connected access points is illustrated. At 1102, a page can be received from an MME where the page comprises a tracking area identifier. At 1104, one or more access points associated with the page can be determined based on the tracking area identifier. As described, access points can register providing one or more related tracking areas. This allows association of the access point to the tracking area so when pages are transmitted, the access points of the tracking area can be determined and paged. Accordingly, at 1106, the page can be transmitted to the one or more access points.

Figure 12:
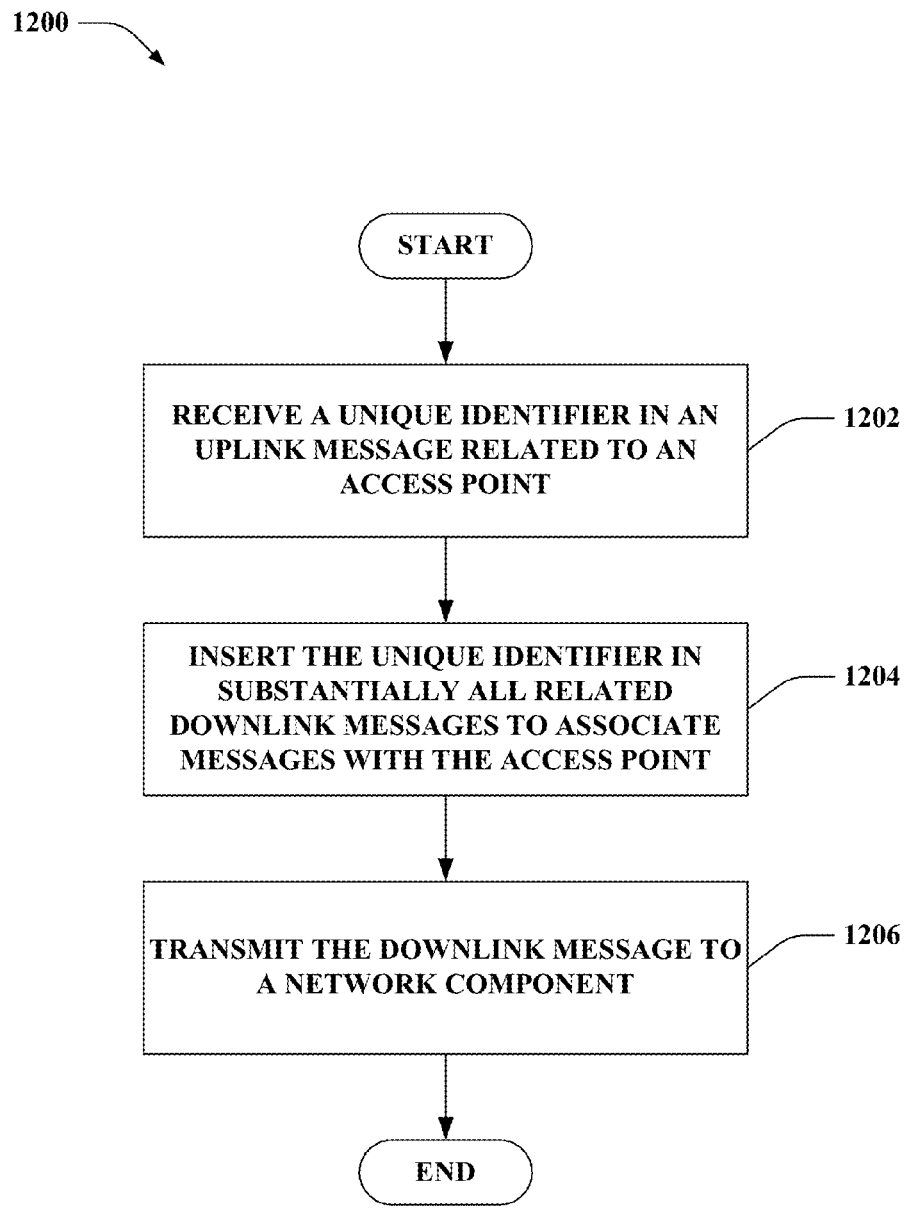
FIG. 12 is an illustration of an example methodology that receives and inserts identifiers related to access points in communicating with a concentrator component.

Referring to FIG. 12, an example methodology 1200 is shown that facilitates indicating access point identifiers in downlink messages. At 1202, a unique identifier can be received in an uplink message related to an access point. At 1204, the unique identifier can be inserted in substantially all related downlink messages to associate the messages with the access point. Thus, a network component receiving the downlink messages can appropriately route the messages to an access point. At 1206, the downlink message can be transmitted to the network component. In this regard, the network component can multiplex messages according to the different identifiers received.

Figure 13:
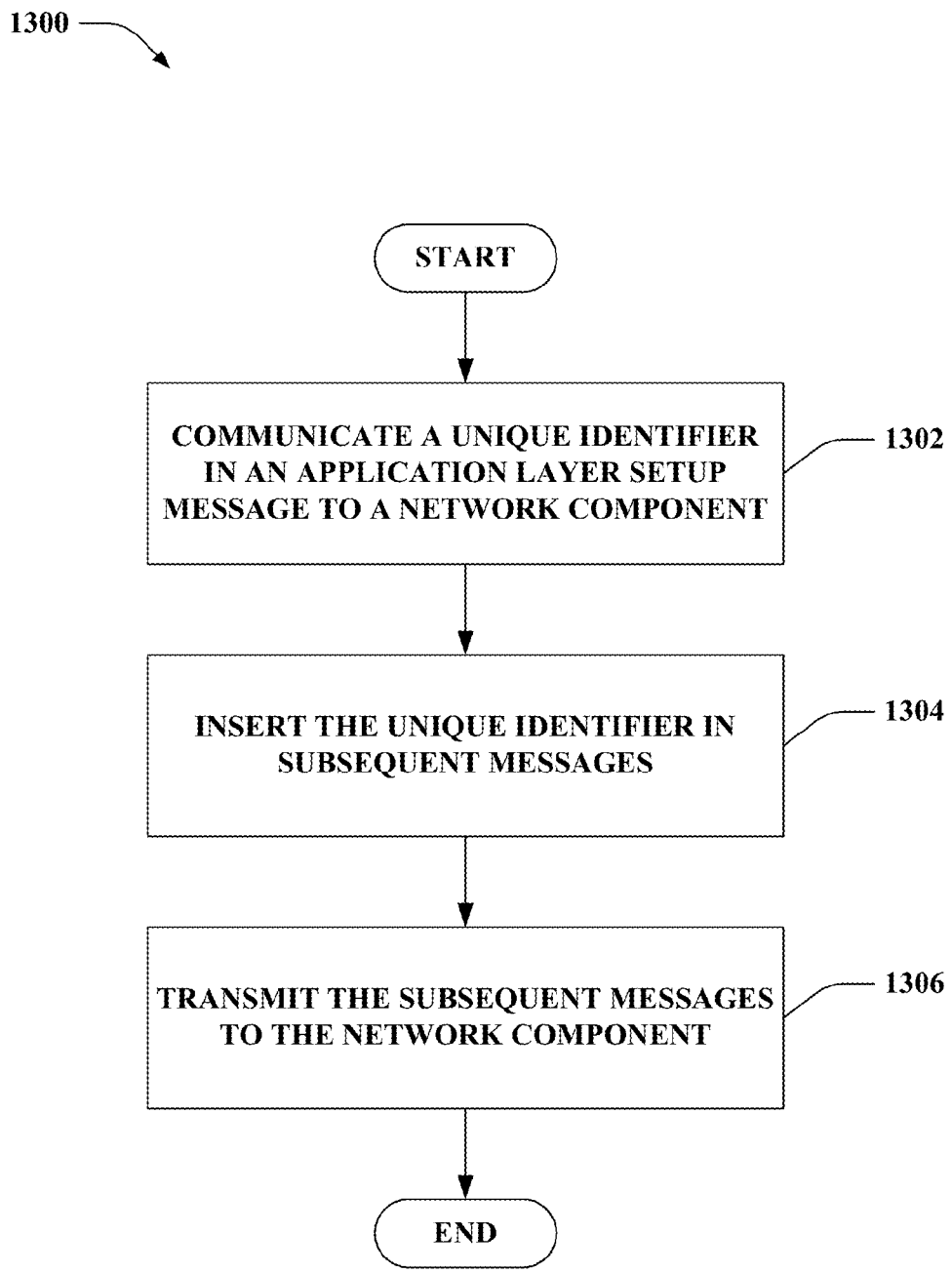
FIG. 13 is an illustration of an example methodology that communicates unique identifiers in messages to upstream network components.

Turning to FIG. 13, an example methodology 1300 that facilitates communicating messages to a network component with associated identifiers is illustrated. At 1302, a unique identifier can be communicated in an application layer setup message to a network component. The unique identifier can relate to an access point and can be provided to identify the access point in subsequent messages. Thus, at 1304, the unique identifier can be inserted in substantially all subsequent messages. At 1306, the subsequent messages can be transmitted to the network component. Accordingly, as described, the network component, which can be a concentrator component, can identify the access point according to the unique identifier.

It will be appreciated that, in accordance with one or more aspects described herein, inferences can be made regarding generating and/or associating unique identifiers with packets transmitted through a concentrator component. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 14:
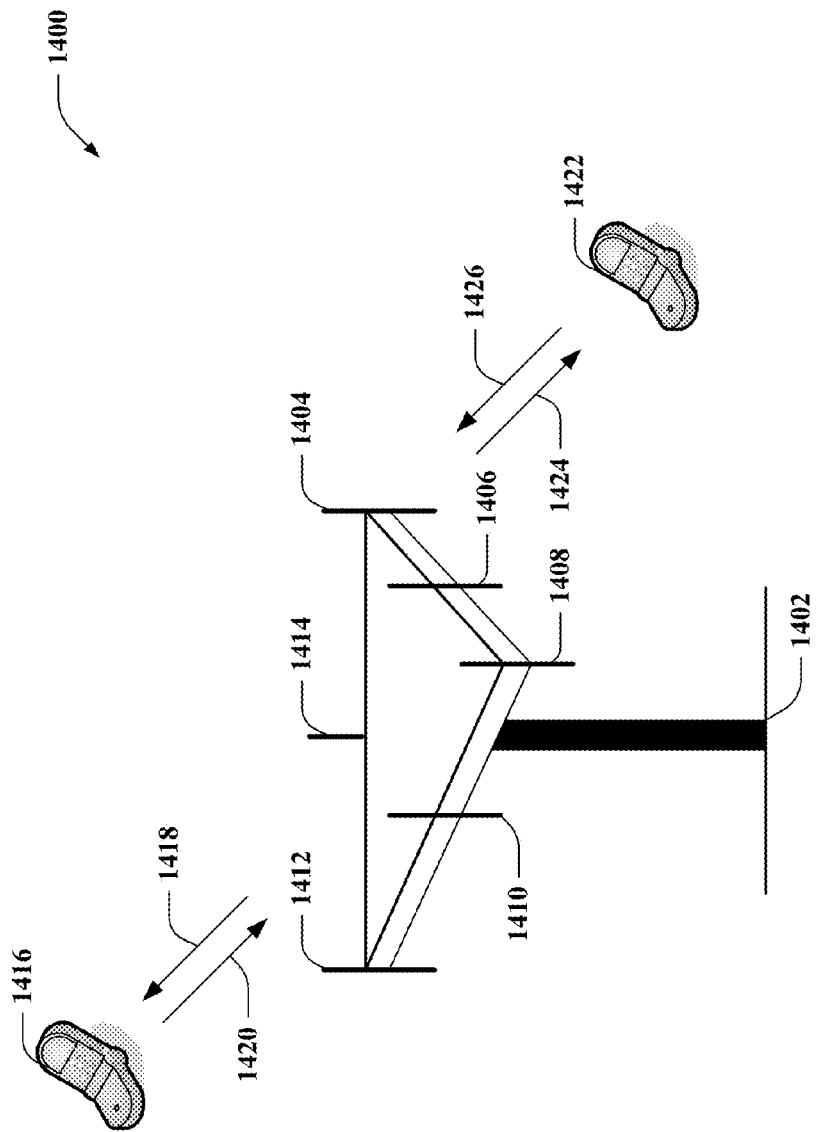
FIG. 14 is an illustration of a wireless communication system in accordance with various aspects set forth herein.

Referring now to FIG. 14, a wireless communication system 1400 is illustrated in accordance with various embodiments presented herein. System 1400 comprises a base station 1402 that can include multiple antenna groups. For example, one antenna group can include antennas 1404 and 1406, another group can comprise antennas 1408 and 1410, and an additional group can include antennas 1412 and 1414. Two antennas are illustrated for each antenna group; however, more or fewer antennas can be utilized for each group. Base station 1402 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 1402 can communicate with one or more mobile devices such as mobile device 1416 and mobile device 1422; however, it is to be appreciated that base station 1402 can communicate with substantially any number of mobile devices similar to mobile devices 1416 and 1422. Mobile devices 1416 and 1422 can be, for example, cellular phones, smart phones, laptops, handheld communication devices, handheld computing devices, satellite radios, global positioning systems, PDAs, and/or any other suitable device for communicating over wireless communication system 1400. As depicted, mobile device 1416 is in communication with antennas 1412 and 1414, where antennas 1412 and 1414 transmit information to mobile device 1416 over a forward link 1418 and receive information from mobile device 1416 over a reverse link 1420. Moreover, mobile device 1422 is in communication with antennas 1404 and 1406, where antennas 1404 and 1406 transmit information to mobile device 1422 over a forward link 1424 and receive information from mobile device 1422 over a reverse link 1426. In a frequency division duplex (FDD) system, forward link 1418 can utilize a different frequency band than that used by reverse link 1420, and forward link 1424 can employ a different frequency band than that employed by reverse link 1426, for example. Further, in a time division duplex (TDD) system, forward link 1418 and reverse link 1420 can utilize a common frequency band and forward link 1424 and reverse link 1426 can utilize a common frequency band.

Each group of antennas and/or the area in which they are designated to communicate can be referred to as a sector of base station 1402. For example, antenna groups can be designed to communicate to mobile devices in a sector of the areas covered by base station 1402. In communication over forward links 1418 and 1424, the transmitting antennas of base station 1402 can utilize beamforming to improve signal-to-noise ratio of forward links 1418 and 1424 for mobile devices 1416 and 1422. Also, while base station 1402 utilizes beamforming to transmit to mobile devices 1416 and 1422 scattered randomly through an associated coverage, mobile devices in neighboring cells can be subject to less interference as compared to a base station transmitting through a single antenna to all its mobile devices. Moreover, mobile devices 1416 and 1422 can communicate directly with one another using a peer-to-peer or ad hoc technology (not shown).

According to an example, system 1400 can be a multiple-input multiple-output (MIMO) communication system. Further, system 1400 can utilize substantially any type of duplexing technique to divide communication channels (e.g., forward link, reverse link, . . . ) such as FDD, FDM, TDD, TDM, CDM, and the like. In addition, communication channels can be orthogonalized to allow simultaneous communication with multiple devices over the channels; in one example, OFDM can be utilized in this regard. Thus, the channels can be divided into portions of frequency over a period of time. In addition, frames can be defined as the portions of frequency over a collection of time periods; thus, for example, a frame can comprise a number of OFDM symbols. The base station 1402 can communicate to the mobile devices 1416 and 1422 over the channels, which can be create for various types of data. For example, channels can be created for communicating various types of general communication data, control data (e.g., quality information for other channels, acknowledgement indicators for data received over channels, interference information, reference signals, etc.), and/or the like.

Figure 15:
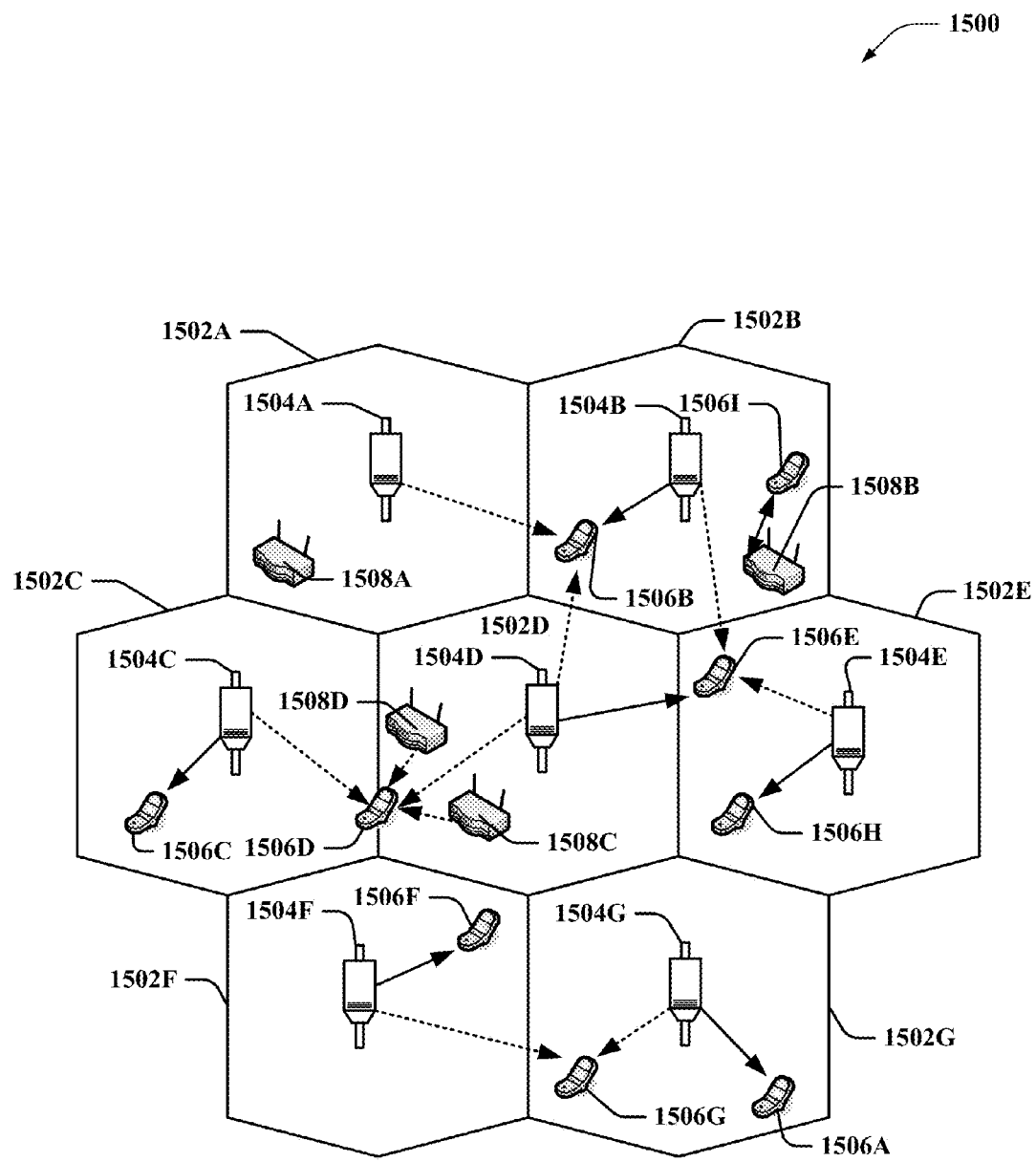
FIG. 15 is an illustration of a wireless communication network in accordance with aspects described herein.

Now referring to FIG. 15, a wireless communication system 1500 configured to support a number of mobile devices is illustrated. The system 1500 provides communication for multiple cells, such as for example, macrocells 1502A-1502G, with each cell being serviced by a corresponding access point 1504A-1504G. As described previously, for instance, the access points 1504A-1504G related to the macrocells 1502A-1502G can be base stations. Mobile devices 1506A-1506I are shown dispersed at various locations throughout the wireless communication system 1500. Each mobile device 1506A-1506I can communicate with one or more access points 1504A-1504G on a forward link and/or a reverse link, as described. In addition, access points 1508A-1508D are shown. These can be small scale access points, such as femtocell access points, picocell access points, relay nodes, mobile base stations, and/or the like, offering services related to a particular service location, as described. The mobile devices 1506A-1506I can additionally or alternatively communicate with these small scale access points 1508A-1508D to receive offered services. The wireless communication system 1500 can provide service over a large geographic region, in one example (e.g., macrocells 1502A-1502G can cover a few blocks in a neighborhood, and the small scale access points 1508A-1508D can be present in areas such as residences, office buildings, and/or the like as described). In an example, the mobile devices 1506A-1506I can establish connection with the access points 1504A-1504G and/or 1508A-1508D over the air and/or over a backhaul connection.

According to an example, mobile devices 1506A-1506I can travel throughout the wireless network and reselect cells provided by the various access points 1504A-1504G and 1508A-1508D. Cell reselection or handover can be performed for a variety of reasons, such as proximity to a target access point, services offered by a target access point, protocols or standards supported by a target access point, favorable billing associated with a target access point, etc. In an example, mobile device 1506D can communicate with access point 1504D and can initiate cell reselection or handover to small scale access point 1508C when within a specified proximity or measured signal strength thereof. To facilitate reselecting small scale access point 1508C, the source access point 1504D can transmit information to the target small scale access point 1508C regarding the mobile device 1506D, such as a context or other information relevant to continuing communications therewith. Thus, the target small scale access point 1508C can provide wireless network access to the mobile device 1506D based on the contextual information to facilitate seamless reselection from the access point 1504D. In this example, an MME or upstream access point (not shown) can facilitate the handover where the access points 1508C and 1504D are connected thereto.

Figure 16:
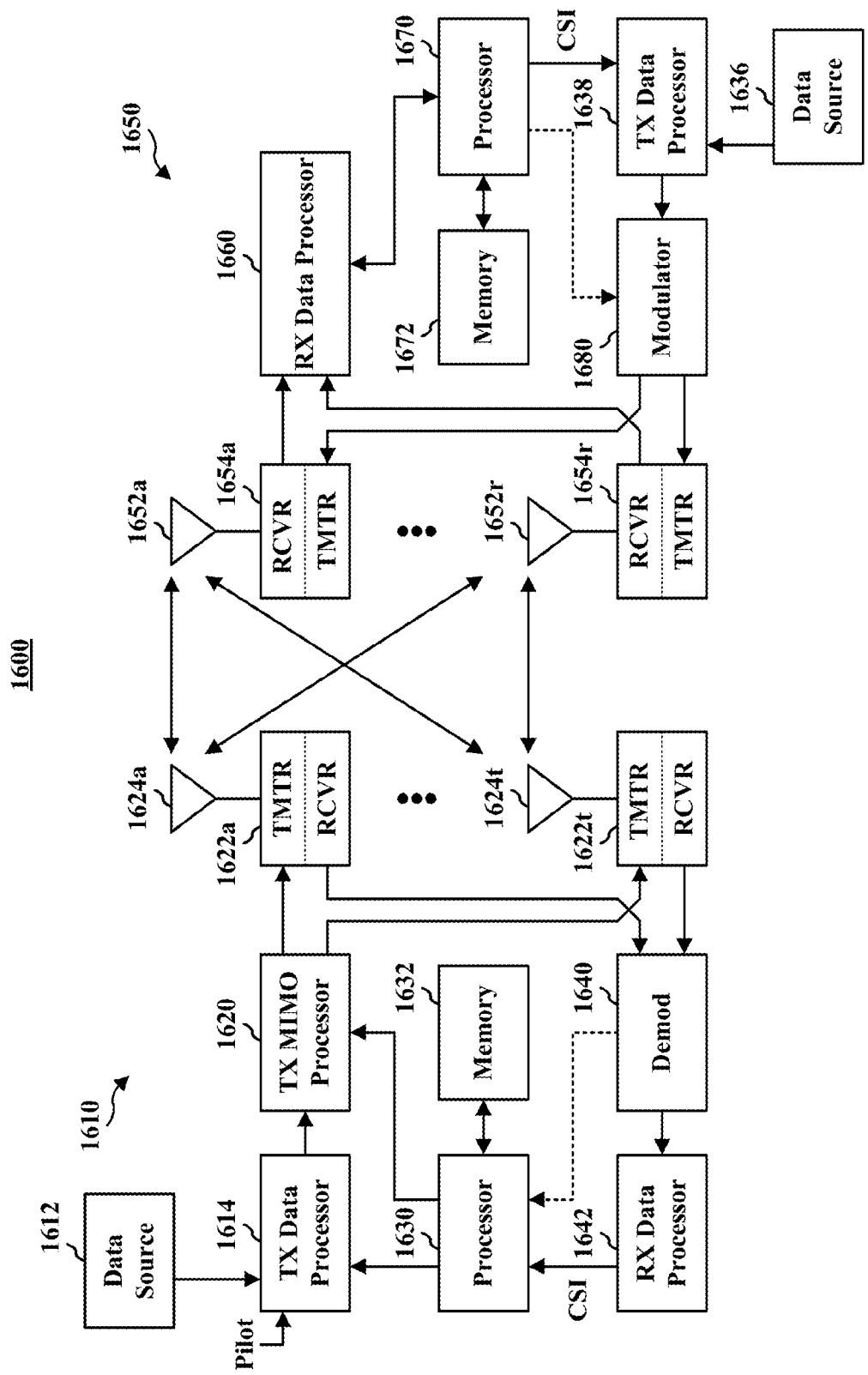
FIG. 16 is an illustration of an example wireless network environment that can be employed in conjunction with the various systems and methods described herein.

FIG. 16 shows an example wireless communication system 1600. The wireless communication system 1600 depicts one base station 1610 and one mobile device 1650 for sake of brevity. However, it is to be appreciated that system 1600 can include more than one base station and/or more than one mobile device, wherein additional base stations and/or mobile devices can be substantially similar or different from example base station 1610 and mobile device 1650 described below. In addition, it is to be appreciated that base station 1610 and/or mobile device 1650 can employ the systems (FIGS. 1-6 and 14-15) and/or methods (FIGS. 7-13) described herein to facilitate wireless communication therebetween.

At base station 1610, traffic data for a number of data streams is provided from a data source 1612 to a transmit (TX) data processor 1614. According to an example, each data stream can be transmitted over a respective antenna. TX data processor 1614 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1650 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1630.

The modulation symbols for the data streams can be provided to a TX MIMO processor 1620, which can further process the modulation symbols (e.g., for OFDM). TX MIMO processor 1620 then provides $N_T$ modulation symbol streams to $N_T$ transmitters (TMTR) 1622a through 1622t. In various aspects, TX MIMO processor 1620 applies beamforming weights to the symbols of the data streams and to the antenna from which the symbol is being transmitted.

Each transmitter 1622 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1622a through 1622t are transmitted from $N_T$ antennas 1624a through 1624t, respectively.

At mobile device 1650, the transmitted modulated signals are received by $N_R$ antennas 1652a through 1652r and the received signal from each antenna 1652 is provided to a respective receiver (RCVR) 1654a through 1654r. Each receiver 1654 conditions (e.g., filters, amplifies, and downconverts) a respective signal, digitizes the conditioned signal to provide samples, and further processes the samples to provide a corresponding "received" symbol stream.

An RX data processor 1660 can receive and process the $N_R$ received symbol streams from $N_R$ receivers 1654 based on a particular receiver processing technique to provide $N_T$ "detected" symbol streams. RX data processor 1660 can demodulate, deinterleave, and decode each detected symbol stream to recover the traffic data for the data stream. The processing by RX data processor 1660 is complementary to that performed by TX MIMO processor 1620 and TX data processor 1614 at base station 1610.

A processor 1670 can periodically determine which precoding matrix to utilize as discussed above. Further, processor 1670 can formulate a reverse link message comprising a matrix index portion and a rank value portion.

The reverse link message can comprise various types of information regarding the communication link and/or the received data stream. The reverse link message can be processed by a TX data processor 1638, which also receives traffic data for a number of data streams from a data source 1636, modulated by a modulator 1680, conditioned by transmitters 1654a through 1654r, and transmitted back to base station 1610.

At base station 1610, the modulated signals from mobile device 1650 are received by antennas 1624, conditioned by receivers 1622, demodulated by a demodulator 1640, and processed by a RX data processor 1642 to extract the reverse link message transmitted by mobile device 1650. Further, processor 1630 can process the extracted message to determine which precoding matrix to use for determining the beamforming weights.

Processors 1630 and 1670 can direct (e.g., control, coordinate, manage, etc.) operation at base station 1610 and mobile device 1650, respectively. Respective processors 1630 and 1670 can be associated with memory 1632 and 1672 that store program codes and data. Processors 1630 and 1670 can also perform computations to derive frequency and impulse response estimates for the uplink and downlink, respectively.

It is to be understood that the aspects described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the aspects are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 17:
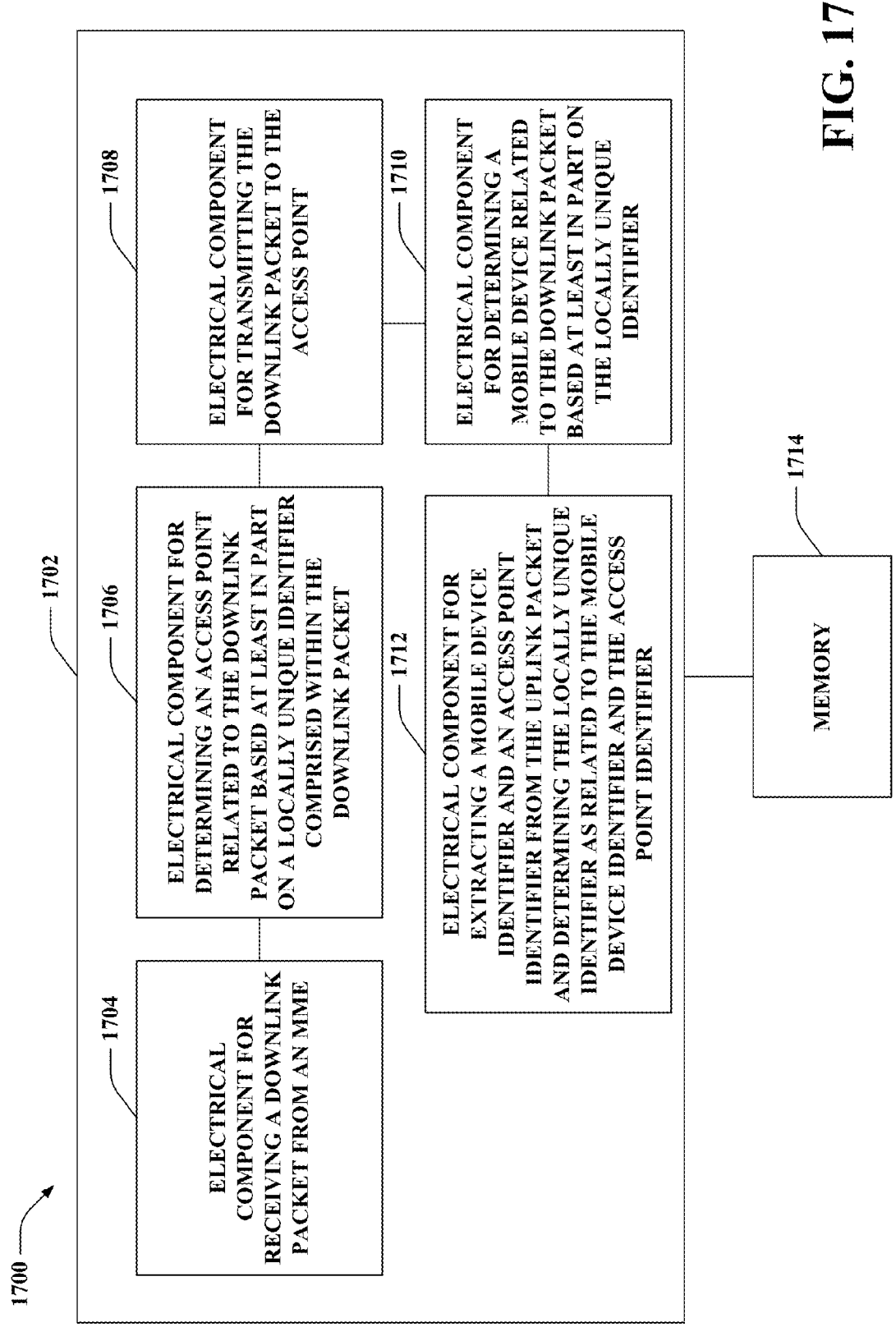
FIG. 17 is an illustration of an example system that facilitates multiplexing access point communication with an MME.

With reference to FIG. 17, illustrated is a system 1700 that facilitates multiplexing access point communication with an MME. For example, system 1700 can reside at least partially within a base station, mobile device, etc. It is to be appreciated that system 1700 is represented as including functional blocks, which can be functional blocks that represent functions implemented by a processor, software, or combination thereof (e.g., firmware). System 1700 includes a logical grouping 1702 of electrical components that can act in conjunction. For instance, logical grouping 1702 can include an electrical component for receiving a downlink packet from an MME 1704. For example, as described, the downlink packet can have an associated identifier and can be in response to an uplink packet transmitted on behalf of an access point related to the identifier, for example. In addition, logical grouping 1702 can include an electrical component for determining an access point related to the downlink packet based at least in part on a locally unique identifier comprised within the downlink packet 1706.

Thus, as described, this can be based on a stored mapping of access point identifiers to locally unique identifiers, based on identifying the access point identifier within the locally unique identifier, and/or the like. Moreover, logical grouping 1702 can include an electrical component for transmitting the downlink packet to the access point 1708. In addition, logical grouping 1702 can include an electrical component for determining a mobile device related to the downlink packet based at least in part on the locally unique identifier 1710. Similarly, the mobile device identifier can be determined from a mapping, indication in the locally unique identifier, and/or the like. Furthermore, logical grouping 1702 can include an electrical component for extracting a mobile device identifier and an access point identifier from the uplink packet and determining the locally unique identifier as related to the mobile device identifier and the access point identifier 1712. The system 1700, though not shown, can also generate the locally unique identifier based on a received uplink packet; thus, the system 1700 can determine the access point and/or mobile device related to the identifier based on previously generating the associated locally unique identifier. Additionally, system 1700 can include a memory 1714 that retains instructions for executing functions associated with electrical components 1704, 1706, 1708, 1710, and 1712. While shown as being external to memory 1714, it is to be understood that one or more of electrical components 1704, 1706, 1708, 1710 and 1712 can exist within memory 1714.

Figure 18:
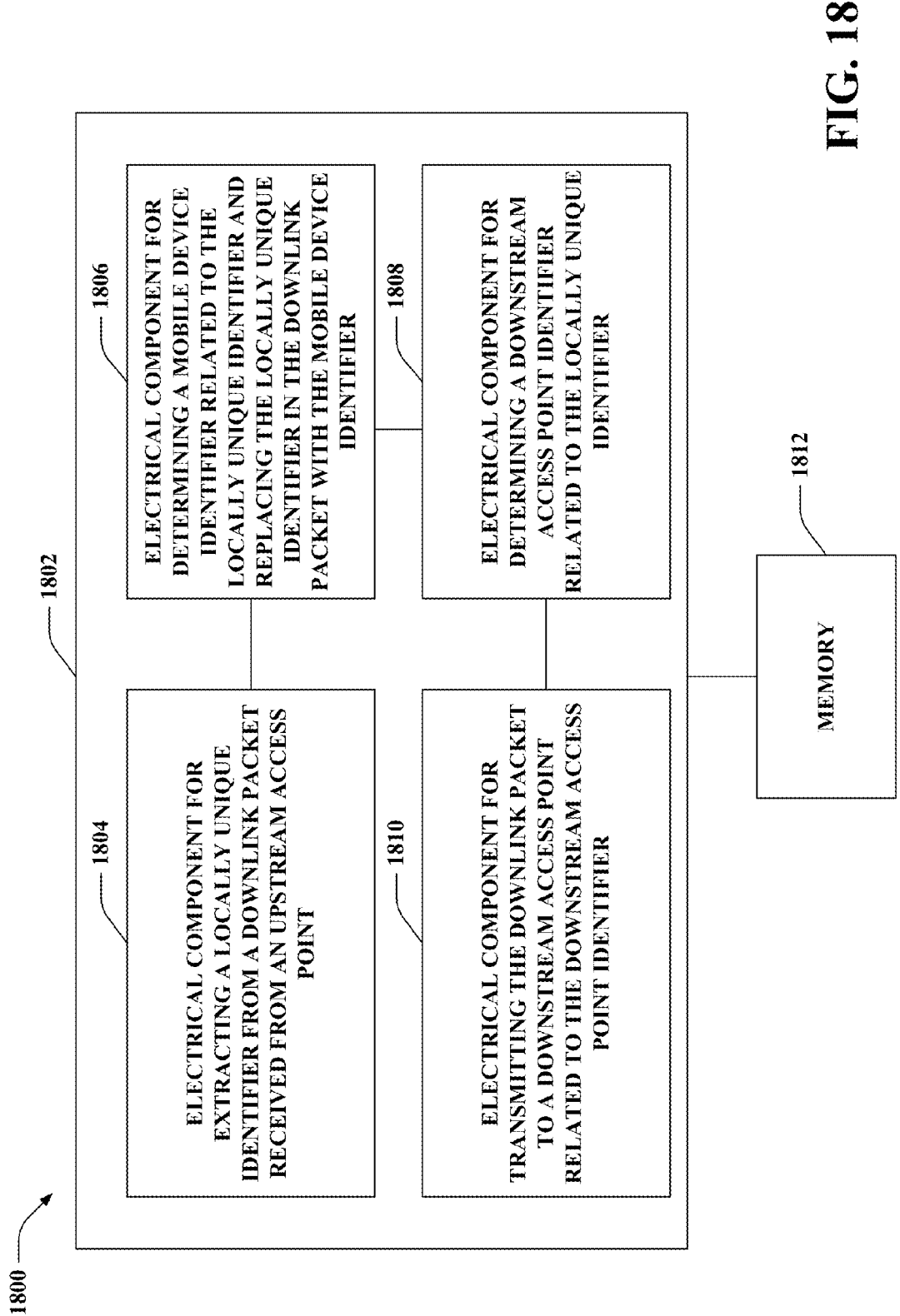
FIG. 18 is an illustration of an example system that facilitates multiplexing access point communication with an upstream access point.

With reference to FIG. 18, illustrated is a system 1800 that facilitates multiplexing access point communication with an upstream access point. For example, system 1800 can reside at least partially within a base station, mobile device, etc. It is to be appreciated that system 1800 is represented as including functional blocks, which can be functional blocks that represent functions implemented by a processor, software, or combination thereof (e.g., firmware). System 1800 includes a logical grouping 1802 of electrical components that can act in conjunction. For instance, logical grouping 1802 can include an electrical component for extracting a locally unique identifier from a downlink packet received from an upstream access point 1804. For example, as described, the downlink packet can have an associated identifier and can be received in response to an uplink packet transmitted on behalf of an access point related to the identifier, for example. In addition, logical grouping 1802 can include an electrical component for determining a mobile device identifier related to the locally unique identifier and replacing the locally unique identifier in the downlink packet with the mobile device identifier 1806.

Moreover, logical grouping 1802 can include an electrical component for determining a downstream access point identifier related to the locally unique identifier 1808. In addition, logical grouping 1802 can include an electrical component for transmitting the downlink packet to a downstream access point related to the downstream access point identifier 1810. Thus, as described, the downstream access point receives the packet with the mobile device identifier, which can be the same as an identifier used to transmit a related uplink packet to the system 1802, as described herein. Additionally, system 1800 can include a memory 1812 that retains instructions for executing functions associated with electrical components 1804, 1806, 1808, and 1810. While shown as being external to memory 1812, it is to be understood that one or more of electrical components 1804, 1806, 1808, and 1810 can exist within memory 1812.

Figure 19:
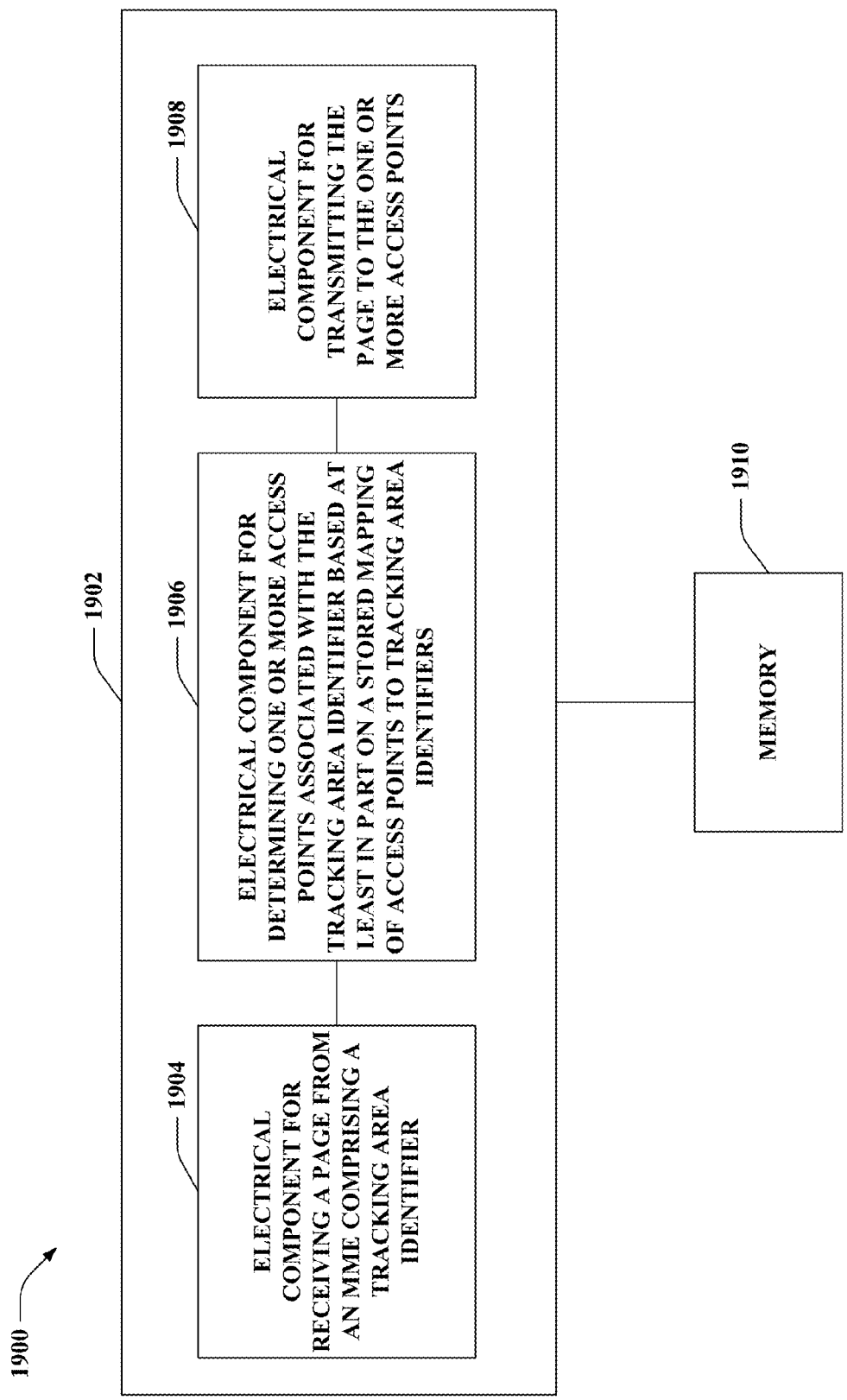
FIG. 19 is an illustration of an example system that provides paging functionality in multiplexed access point communication.

With reference to FIG. 19, illustrated is a system 1900 that implements paging for multiple access points communicating with a concentrator to receive MME access. For example, system 1900 can reside at least partially within a base station, mobile device, etc. It is to be appreciated that system 1900 is represented as including functional blocks, which can be functional blocks that represent functions implemented by a processor, software, or combination thereof (e.g., firmware). System 1900 includes a logical grouping 1902 of electrical components that can act in conjunction. For instance, logical grouping 1902 can include an electrical component for receiving a page from an MME comprising a tracking area identifier 1904. Furthermore, logical grouping 1902 can include an electrical component for determining one or more access points associated with the tracking area identifier based at least in part on a stored mapping of access points to tracking area identifiers 1906.

As described, access points can register with the system 1900 specifying tracking area identifiers, which can be stored in association with the access point in a map or routing table. Moreover, logical grouping 1902 can include an electrical component for transmitting the page to the one or more access points 1908. Additionally, system 1900 can include a memory 1910 that retains instructions for executing functions associated with electrical components 1904, 1906, and 1908. While shown as being external to memory 1910, it is to be understood that one or more of electrical components 1904, 1906, and 1908 can exist within memory 1910.

Figure 20:
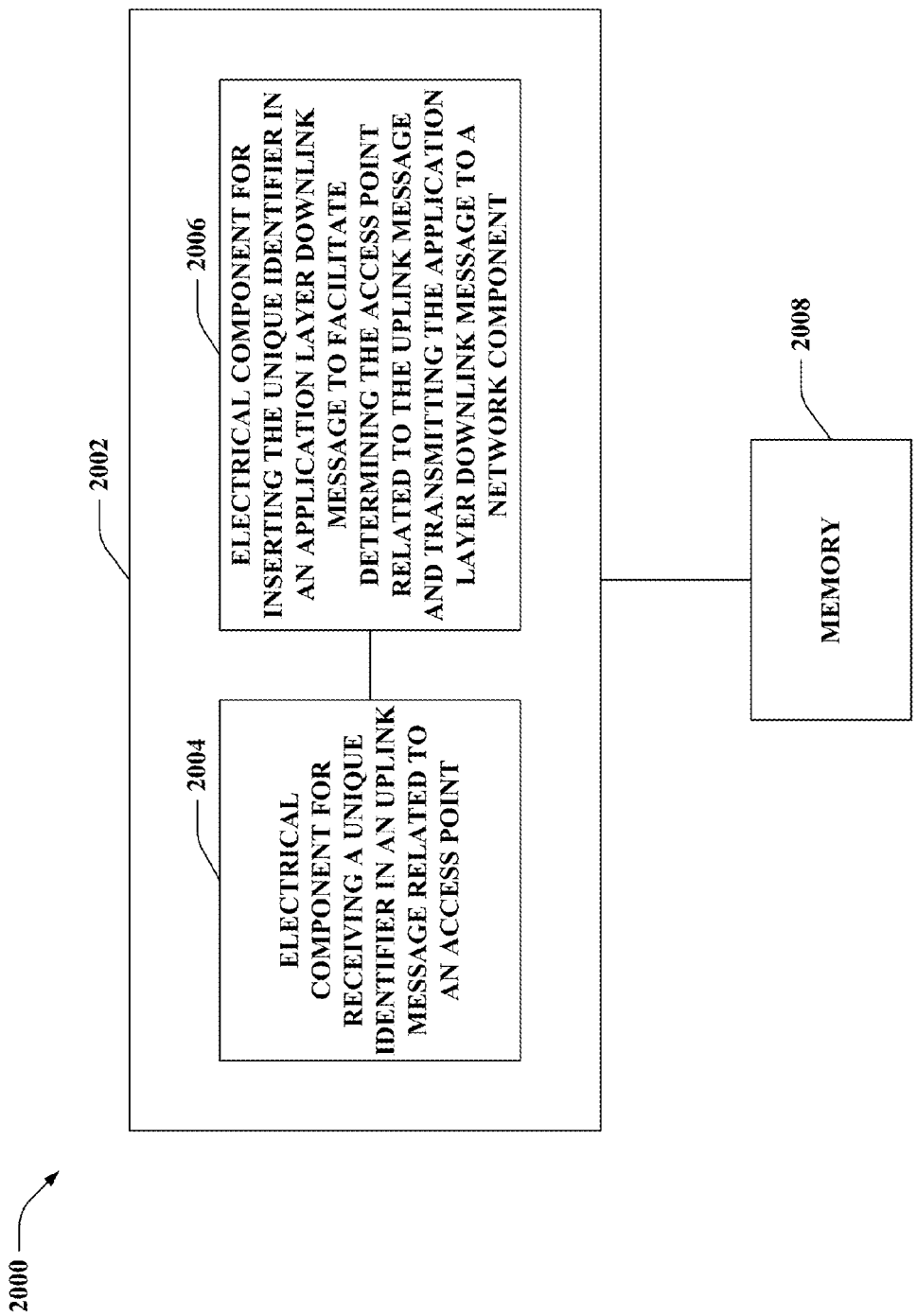
FIG. 20 is an illustration of an example system that receives and utilizes access point identifiers in communicating with related access points.

With reference to FIG. 20, illustrated is a system 2000 that inserts access point identifiers in downlink messages to facilitate multiplexing access point communication. For example, system 2000 can reside at least partially within a base station, mobile device, etc. It is to be appreciated that system 2000 is represented as including functional blocks, which can be functional blocks that represent functions implemented by a processor, software, or combination thereof (e.g., firmware). System 2000 includes a logical grouping 2002 of electrical components that can act in conjunction. For instance, logical grouping 2002 can include an electrical component for receiving a unique identifier in an uplink message related to an access point 2004. For example, as described, the identifier can be utilized to identify the source of the message as well as to associate the access point with a corresponding downlink message. In addition, logical grouping 2002 can include an electrical component for inserting the unique identifier in an application layer downlink message to facilitate determining the access point related to the uplink message and transmitting the application layer downlink message to a network component 2006. The network component, as described, can determine the appropriate access point for forwarding the message based on the identifier. Additionally, system 2000 can include a memory 2008 that retains instructions for executing functions associated with electrical components 2004 and 2006. While shown as being external to memory 2008, it is to be understood that one or more of electrical components 2004 and 2006 can exist within memory 2008.

Figure 21:
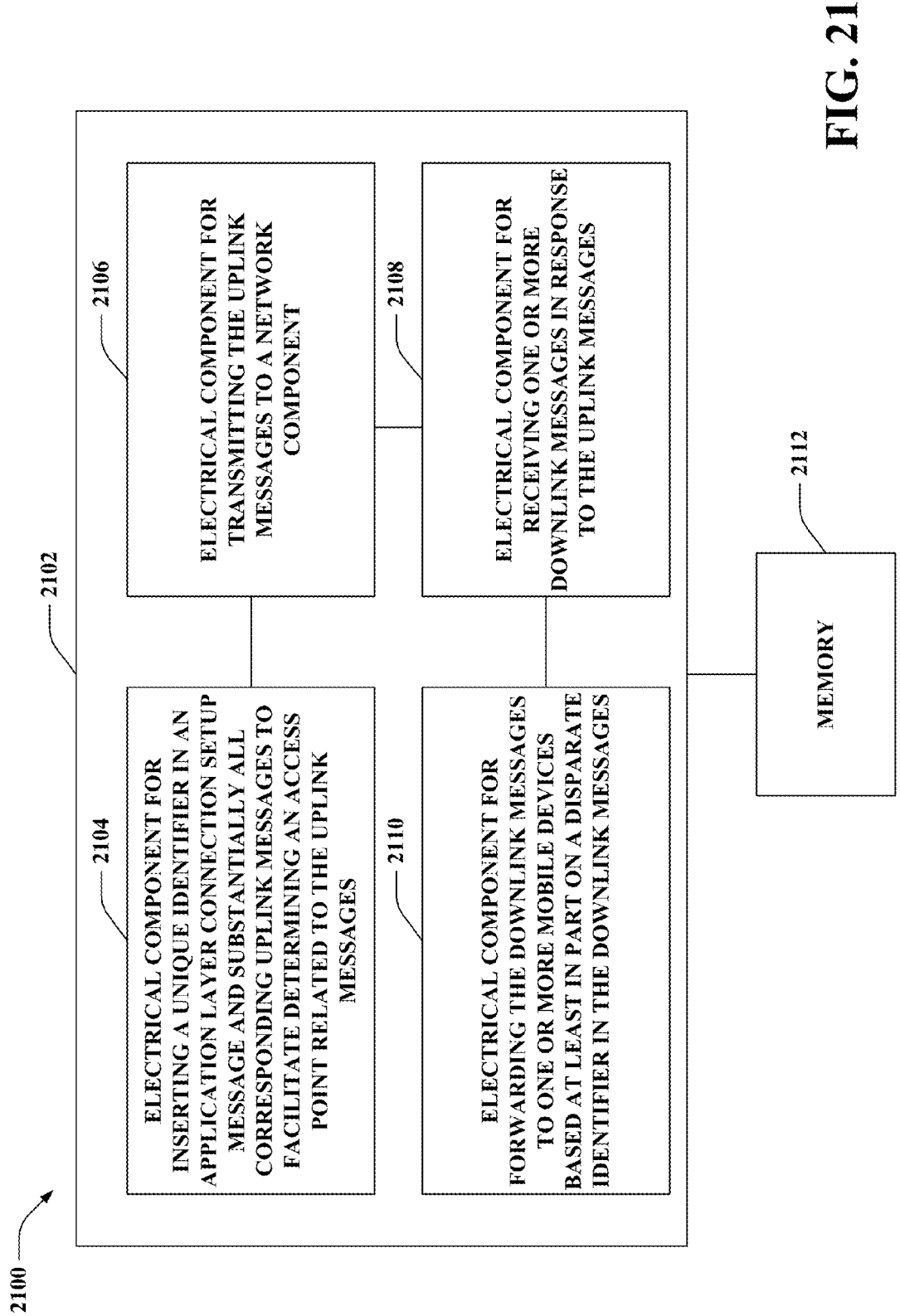
FIG. 21 is an illustration of an example system that provides identifiers in messages to upstream network components.

With reference to FIG. 21, illustrated is a system 2100 that receives messages from upstream network components via a concentrator. For example, system 2100 can reside at least partially within a base station, MME, mobile device, etc. It is to be appreciated that system 2100 is represented as including functional blocks, which can be functional blocks that represent functions implemented by a processor, software, or combination thereof (e.g., firmware). System 2100 includes a logical grouping 2102 of electrical components that can act in conjunction. For instance, logical grouping 2102 can include an electrical component for inserting a unique identifier in an application layer connection setup message and substantially all corresponding uplink messages to facilitate determining an access point related to the uplink messages 2104. Furthermore, logical grouping 2102 can include an electrical component for transmitting the uplink messages to a network component 2106.

Thus, the network component can identify the access point transmitting the messages, as described. In addition, the uplink messages can comprise a mobile device identifier where applicable. Moreover, logical grouping 2102 can include an electrical component for receiving one or more downlink messages in response to the uplink messages 2108. As described, the downlink messages can comprise the mobile device identifier. Furthermore, logical grouping 2102 can includes an electrical component for forwarding the downlink messages to one or more mobile devices based at least in part on a disparate identifier in the downlink messages 2110. Additionally, system 2100 can include a memory 2112 that retains instructions for executing functions associated with electrical components 2104, 2106, 2108 and 2110. While shown as being external to memory 2112, it is to be understood that one or more of electrical components 2104, 2106, 2108, and 2110 can exist within memory 2112.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Furthermore, to the extent that the term "includes" is used in either the detailed description or the claims, such term is intended to be inclusive in a manner similar to the term "comprising" as "comprising" is interpreted when employed as a transitional word in a claim. Furthermore, although elements of the described aspects and/or aspects may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method, comprising:
receiving a page at a concentrator component, the page identifying one or more mobile devices, the page being received from a network entity that is separate from the concentrator component, and the page comprising a tracking area identifier, wherein the tracking area identifier is an identifier that is unique to a tracking area;
determining one or more downstream access points associated with the tracking area identifier based at least in part on a stored mapping of downstream access points to tracking area identifiers; and
transmitting the page from the concentrator component to the one or more downstream access points.

2. The method of claim 1, further comprising receiving one or more tracking area identifiers associated with a downstream access point and storing an association between the downstream access point and the one or more tracking area identifiers in the stored mapping.

3. The method of claim 2, further comprising:
determining at least one of the one or more tracking area identifiers is a new tracking area identifier; and
transmitting a configuration update message comprising the new tracking area identifier to the network entity.

4. The method of claim 2, wherein the one or more tracking area identifiers are associated with one or more locations served by the downstream access point.

5. The method of claim 1, further comprising indicating the tracking area identifier in a message transmitted to the network entity on behalf of the one or more downstream access points associated with the tracking area identifier.

6. The method of claim 1, wherein the page comprises one or more identifiers that identify the one or more mobile devices, and wherein the page is destined for the one or more mobile devices via the one or more downstream access points.

7. The method of claim 1, further comprising:
the concentrator component establishing a first connection with the network entity;
the concentrator component receiving a globally unique identifier for the network entity during establishment of the first connection with the network entity;
the concentrator component receiving, from an access point, a request for access to the network entity;
the concentrator component establishing a second connection with the access point upon receiving the request for access to the network entity; and
the concentrator component transmitting the globally unique identifier for the network entity to the access point as if the access point had set up a connection directly with the network entity.

8. A wireless communications apparatus that implements a concentrator component, comprising:
at least one processor configured to:
receive a page at the concentrator component, the page identifying one or more mobile devices, the page being received from a network entity that is separate from the concentrator component, and the page comprising a tracking area identifier, wherein the tracking area identifier is an identifier that is unique to a tracking area;
discern one or more downstream access points associated with the tracking area identifier based at least in part on a stored association of downstream access points to tracking area identifiers; and
transmit the page from the concentrator component to the one or more downstream access points; and
a memory coupled to the at least one processor.

9. The wireless communications apparatus of claim 8, wherein the at least one processor is further configured to obtain one or more tracking area identifiers associated with a downstream access point and store an association between the downstream access point and the one or more tracking area identifiers in the stored association.

10. The wireless communications apparatus of claim 8, wherein the page comprises one or more identifiers corresponding to the one or more mobile devices to receive the page via the one or more downstream access points.

11. An apparatus that implements a concentrator component, comprising:
means for receiving a page at the concentrator component, the page identifying one or more mobile devices, the page being received from a network entity that is separate from the concentrator component, and the page comprising a tracking area identifier, wherein the tracking area identifier is an identifier that is unique to a tracking area;
means for determining one or more downstream access points associated with the tracking area identifier based at least in part on a stored mapping of downstream access points to tracking area identifiers; and
means for transmitting the page from the concentrator component to the one or more downstream access points.

12. The apparatus of claim 11, wherein the means for determining one or more downstream access points associated with the tracking area identifier receives one or more tracking area identifiers associated with a downstream access point and stores an association between the downstream access point and the one or more tracking area identifiers in the stored mapping.

13. The apparatus of claim 12, wherein the means for determining one or more downstream access points associated with the tracking area identifier determines at least one of the one or more tracking area identifiers is a new tracking area identifier and the means for receiving the page from the network entity transmits a configuration update message comprising the new tracking area identifier to the network entity.

14. The apparatus of claim 12, wherein the one or more tracking area identifiers are associated with one or more locations served by the downstream access point.

15. The apparatus of claim 11, wherein the means for determining one or more downstream access points associated with the tracking area identifier indicates the tracking area identifier in a message transmitted to the network entity on behalf of the one or more downstream access points associated with the tracking area identifier.

16. The apparatus of claim 11, wherein the page comprises one or more identifiers corresponding to the one or more mobile devices to receive the page via the one or more downstream access points.

17. A computer program product, comprising:
a non-transitory computer-readable medium comprising:
- code for causing at least one computer that comprises a concentrator component to receive a page from a network entity that is separate from the concentrator component, the page identifying one or more mobile devices, and the page comprising a tracking area identifier, wherein the tracking area identifier is an identifier that is unique to a tracking area;
- code for causing the at least one computer to determine one or more downstream access points associated with the tracking area identifier based at least in part on a stored mapping of downstream access points to tracking area identifiers; and
- code for causing the concentrator component of the at least one computer to transmit the page to the one or more downstream access points.

18. The computer program product of claim 17, wherein the computer-readable medium further comprises code for causing the at least one computer to receive one or more tracking area identifiers associated with a downstream access point and store an association between the downstream access point and the one or more tracking area identifiers in the stored mapping.

19. An apparatus, comprising:
a concentrator component, comprising:
- an upstream communication component that receives a page from a network entity that is separate from the concentrator component, the page identifying one or more mobile devices, and the page comprising a tracking area identifier, wherein the tracking area identifier is an identifier that is unique to a tracking area;
- a paging component that determines one or more downstream access points associated with the tracking area identifier based at least in part on a stored mapping of downstream access points to tracking area identifiers; and
- a downstream communication component transmitting the page to the one or more downstream access points.

20. The apparatus of claim 19, wherein the paging component receives one or more tracking area identifiers associated with a downstream access point and stores an association between the downstream access point and the one or more tracking area identifiers in the stored mapping.

21. The apparatus of claim 20, wherein the paging component determines at least one of the one or more tracking area identifiers is a new tracking area identifier and the upstream communication component transmits a configuration update message comprising the new tracking area identifier to the network entity.

22. The apparatus of claim 19, wherein the paging component indicates the tracking area identifier in a message transmitted to the network entity on behalf of the one or more downstream access points associated with the tracking area identifier.

* * * * *